(12) United States Patent
Chao

(10) Patent No.: US 10,133,960 B2
(45) Date of Patent: *Nov. 20, 2018

(54) METHODS AND SYSTEMS FOR DETERMINING IMAGE SIMILARITY

(71) Applicant: Facebook, Inc., Menlo Park, CA (US)

(72) Inventor: Isaac Chao, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/143,233

(22) Filed: Apr. 29, 2016

(65) Prior Publication Data

US 2016/0247042 A1    Aug. 25, 2016

Related U.S. Application Data

(63) Continuation of application No. 14/471,353, filed on Aug. 28, 2014, now Pat. No. 9,361,542, which is a
(Continued)

(51) Int. Cl.
| | |
|---|---|
| *G06K 9/62* | (2006.01) |
| *G06F 17/30* | (2006.01) |
| *G06K 9/48* | (2006.01) |
| *G06K 9/46* | (2006.01) |
| *G06Q 50/00* | (2012.01) |

(52) U.S. Cl.
CPC ....... *G06K 9/6215* (2013.01); *G06F 17/3028* (2013.01); *G06F 17/30244* (2013.01); *G06F 17/30247* (2013.01); *G06F 17/30256* (2013.01); *G06K 9/46* (2013.01); *G06K 9/481* (2013.01);
(Continued)

(58) Field of Classification Search
CPC ........ G06K 9/6215; G06K 9/46; G06K 9/481; G06K 9/6202; G06K 9/6218; G06K 9/622; G06F 17/30244; G06F 17/30247; G06F 17/30256; G06F 17/3028
See application file for complete search history.

(56) References Cited

U.S. PATENT DOCUMENTS 6,661,922 B1 * 12/2003 Boettcher ............... G06F 17/18
382/225
2009/0097756 A1    4/2009 Kato
(Continued)

OTHER PUBLICATIONS

Lv, "Similarity Search for Large-Scale Image Datasets," 2006, Princeton University, 125 pages.*
(Continued)

*Primary Examiner* — David F Dunphy
(74) *Attorney, Agent, or Firm* — Baker Botts L.L.P.

(57) ABSTRACT

In one embodiment, a computing device receives an image. A large hash value is generated for the image based on a content-aware hashing function, resulting in the large hash value having a first number of dimensions. A small hash value is calculated for the image based on the large hash value and a locality-sensitive hashing function. The small hash value has a reduced number of dimensions compared to the large hash value. The small hash values for two or more images, respectively, will be close to each other if the two or more images are similar in content, and the small hash values will be different if the images are not similar. The small hash value for the image is used to determine whether the image is similar to one or more other images.

57 Claims, 23 Drawing Sheets

Related U.S. Application Data continuation of application No. 13/545,783, filed on Jul. 10, 2012, now Pat. No. 8,849,047.

(52) U.S. Cl.
CPC ........... *G06K 9/6202* (2013.01); *G06K 9/622* (2013.01); *G06K 9/6218* (2013.01); *G06Q 50/01* (2013.01)

(56) References Cited

U.S. PATENT DOCUMENTS

2009/0217344 A1* 8/2009 Bellwood ............... G06F 21/10 726/1
2011/0058057 A1 3/2011 Tokunaga et al.

OTHER PUBLICATIONS

Koga et al, "Fast agglomerative hierarchical clustering algorithm using Locality-Sensitive Hashing," 2007, Knowl Inf Syst (2007) 12(1), pp. 25-53.*

Kuo et al., "Query Expansion for Hash-based Image Object Retrieval," National Taiwan University, Taipei, Taiwan. MM'09, Beijing, China, 10 pages, Oct. 19-24, 2009.

Chinese Office Action received from the State Intellectual Property Office of the People's Republic of China, for Chinese Patent Application No. 2013800469338, dated Jul. 6, 2016.

Naisong, Wen, "Research on Local Feature based Image Copy Detection," Chinese Selected Doctoral Dissertations and Master's Theses Full-Text Databases, P.R., China, 27 pages, Jan. 17, 2011.

Notification of the First Office Office Action received from the State Intellectual Property Office of the People's Republic of China, for Chinese Patent Application No. 2013800469338, dated Jul. 6, 2016.

Notification of the Second Office Office Action received from the State Intellectual Property Office of the People's Republic of China, for Chinese Patent Application No. 2013800469338, dated Feb. 17, 2017.

EP Communication received from EPO for Patent Application No. 13175255.2-1207, Jul. 12, 2018.

* cited by examiner

METHODS AND SYSTEMS FOR DETERMINING IMAGE SIMILARITY

PRIORITY

This application is a continuation under 35 U.S.C. § 120 of U.S. patent application Ser. No. 14/471,353, filed 28 Aug. 2014, which is a continuation under 35 U.S.C. § 120 of U.S. patent application Ser. No. 13/545,783, filed 10 Jul. 2012, now U.S. Pat. No. 8,849,047.

FIELD OF THE INVENTION

The present application relates to image processing and, in particular, systems and methods for determination of image similarity on a social networking system.

BACKGROUND

Social networking websites provide a dynamic environment in which members can connect to and communicate with other members. These websites commonly may provide online mechanisms allowing members to interact within their preexisting social networks as well as create new social networks. Members may include any individual or other entity, such as an organization or business. Among other attributes, social networking websites allow members to effectively and efficiently communicate relevant information to their social networks. For example, a member may post personal information, job information, biographical information, and other personalized content to areas of the website dedicated to the member. Other members may access the posted content by browsing member profiles or performing dedicated searches.

One popular type of content posted to social networking websites is images. Members often post images to communicate personal information to their social networks. For example, posted images may depict family, friends, locations, items, and any other subject matter in which a member may have interest. Social networking websites usually encourage the posting of images because the sharing of personal information fosters communication among members, and thus helps to realize the potential of the websites.

Certain images may contain content in which social networking websites take special interest for myriad reasons. For example, a social networking website may seek to intervene when the same photo is repeatedly posted by different members in violation of the website's terms of use or other guidelines. As another example, a social networking website may seek to restrict the posting of an image known by the website to contain inappropriate content. To identify these kinds of objectionable images, images may be compared for similarity or identity with images known to be objectionable. When images similar to objectionable images are identified, social networking websites may take appropriate action on them. However, due to the large number of images maintained by social networking websites and the significant computational expense in performing image comparisons, social networking websites confront challenges in efficiently identifying similar images.

SUMMARY

To allow identification and management of images that are similar or identical in content, embodiments of the invention provide for efficient comparison of images by a social networking system. When the social networking system determines that images are similar, the similar images are associated. Association of similar images facilitates the performance of administrative action on the images. Administrative action may involve the control of certain images whose content may be subject to special handling by the social networking system. For example, different members may post, or attempt to post, the same image in violation of guidelines of the social networking system that, in certain circumstances, encourage or mandate the posting of personalized, unique content only. In accordance with its guidelines, the social networking system may restrict postings of such an image. As another example, if an image is found to contain inappropriate content, the social networking system may prevent or remove all postings of the image. The effectiveness of these administrative actions is based on an ability to identify all instances of an image through image similarity determinations.

To determine possible image similarity, a large hash value may be generated for a new image by applying a content-aware hashing function to the image. A small hash value then may be generated for the image by applying locality-sensitive hashing to the large hash value. Locality-sensitive hashing involves projection of the large hash value onto one or more vectors that map to a corresponding coordinate system. Such projection involves reduction of the large hash value from a dimension number k to a dimension number d. Each vector of the d-D coordinate system is divided into a number of segments that define buckets into which the small hash value may potentially fall.

The reduction in the number of dimensions in locality-sensitive hashing results in loss of information, increasing the probability that small hash values will be similar even when their corresponding images are actually different. Thus, different images may be incorrectly deemed to be similar because their small hash values are similar or fall into the same bucket. This type of error is often referred to as "false positives." Further, based on arbitrary coordinate definitions that determine the boundary of a bucket, similar images may be incorrectly deemed to be different because their small hash values fall into different buckets. This type of error is often referred to as "false negatives."

In an embodiment of the invention, the problem of false positives is addressed. Existing cluster centers associated with the bucket into which the small hash value falls are identified. Existing cluster centers are those that have already been created for existing images and stored by the social networking system. The search space for the new image is substantially reduced by considering only cluster centers that are associated with the bucket instead of all cluster centers stored by the social networking system. The reduction in the search space provides computational efficiencies in the comparison of images.

If there are no existing cluster centers associated with the bucket, then a new cluster center is created for the new image and is given the coordinates of the small hash value. The new image is then associated with the new cluster center. Conversely, if there is at least one existing cluster center associated with the bucket, the distance between the small hash value and each existing cluster center is determined. If the distance from the small hash value to any existing cluster center is greater than a threshold distance, then the new image is considered to be different from the images associated with the existing cluster centers. A new cluster center is then created for the new image, and the new image is associated with the new cluster center. Thus, more than one cluster center may be created and associated with the bucket if the images are not considered to be similar. If the distance from the small hash value to at least one existing cluster center is less than the threshold distance, then an existing cluster center with the smallest distance to the small hash value of the new image is identified. The new image is considered to be similar to the images associated with the identified existing cluster center, and the new image may be associated with the identified existing cluster center.

In an embodiment of the invention, the problem of false negatives is addressed. Buckets that are close to the small hash value may be identified. The identified buckets may be those that are adjacent to the small hash value and have, as one of their vertices, the vertex in the coordinate system closest to the small hash value. The buckets that are close to the small hash value may also be identified in other manners. All existing cluster centers associated with the identified buckets are identified. The search space for the new image is substantially reduced by considering only cluster centers that are associated with the buckets that are close to the small hash value instead of all cluster centers stored by the social networking system. The reduction of the search space provides further computational efficiencies in the comparison of images.

If there is no existing cluster center associated with any of the identified buckets, a new cluster center is created for the new image and is given the coordinates of the small hash value. The new image is then associated with the new cluster center. Conversely, if there is at least one existing cluster center associated with the identified buckets, then the distance between the small hash value and each existing cluster center is determined. If the distance from the small hash value to any existing cluster center is greater than a threshold distance, then the new image is considered to be different from the images associated with the existing cluster centers. A new cluster center is then created for the new image, and the new image is associated with the new cluster center. If the distance from the small hash value to at least one existing cluster center is less than the threshold distance, then an existing cluster center with the smallest distance to the small hash value of the new image is identified. The new image may be associated with the identified existing cluster center, and the new image is considered to be similar to the images associated with the identified existing cluster center.

In an embodiment, once the relevant buckets are identified with the small hash value, the large hash value, instead of the small hash value, may be used to create a cluster center or to compare with an existing cluster center associated with the identified buckets in the assessment of image similarity.

In an embodiment of the invention, administrative action may be taken to restrict use of an image based on identification of an associated cluster center. For example, if an image is deemed inappropriate or otherwise subject to special handling by the social networking system, the cluster center associated with the image may be identified. Then, all images associated with the cluster center may be identified. Once so identified, the images may be taken down from the social networking system. As another example, if an image is deemed inappropriate, the cluster center associated with the image may be identified. Once the cluster center is so identified, any future images that may be associated with the cluster center will not be able to be uploaded to the social networking system.

Many other features and embodiments of the invention will be apparent from the accompanying drawings and from the following detailed description.

Figure 1:
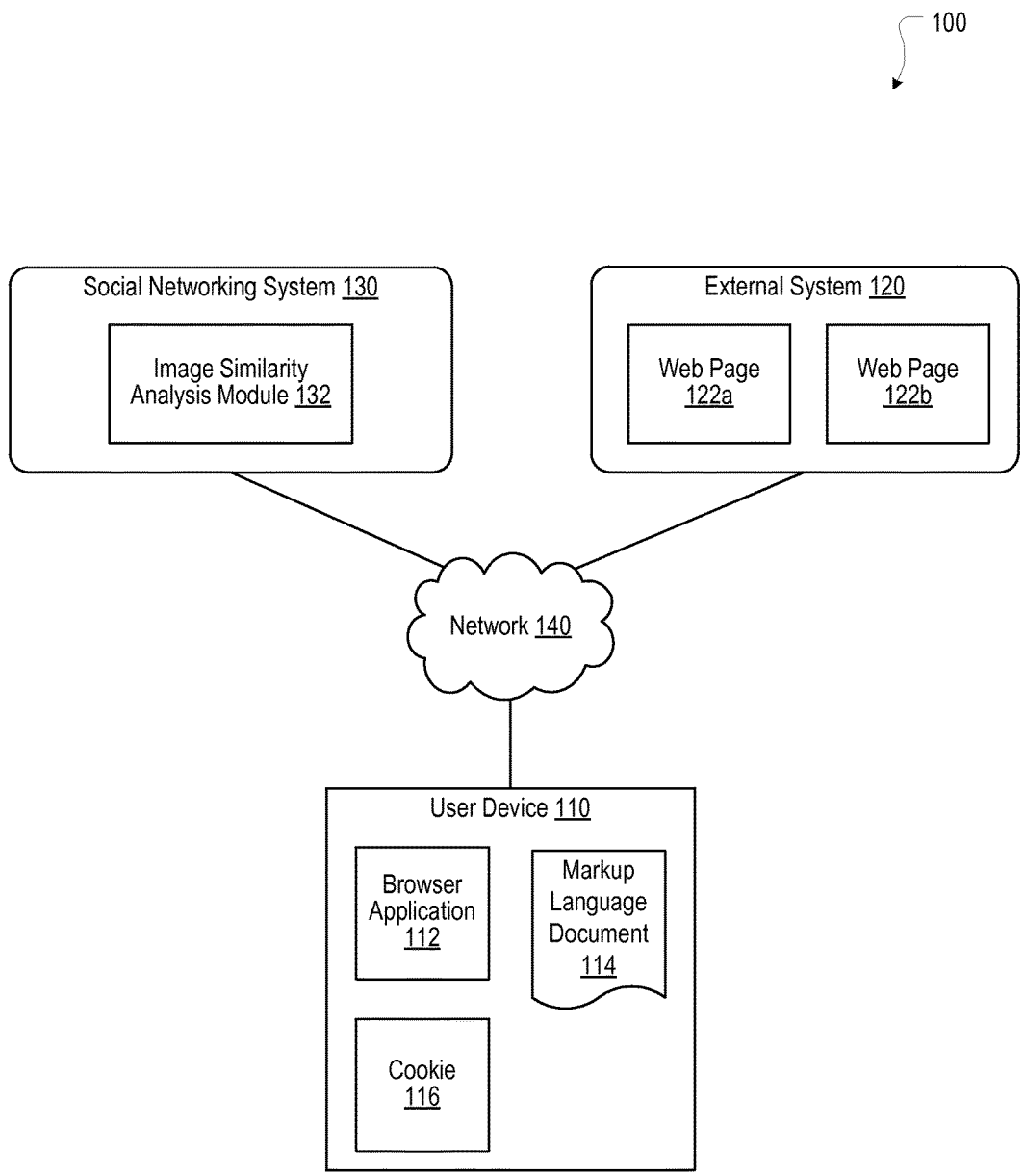
FIG. 1 is a network diagram of a system for determining image similarity in connection with a social networking system in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated herein may be employed without departing from the principles of the invention described herein.

DETAILED DESCRIPTION

Social Networking System—General Introduction

FIG. 1 is a network diagram of a system 100 for determining image similarity in connection with a social networking system 130 in accordance with an embodiment of the invention. The system 100 includes one or more user devices 110, one or more external systems 120, the social networking system 130, and a network 140. For purposes of illustration, the embodiment of the system 100 shown by FIG. 1 includes a single external system 120 and a single user device 110. However, in other embodiments, the system 100 may include more user devices 110 and/or more external systems 120. In certain embodiments, the social networking system 130 is operated by a social network provider, whereas the external systems 120 are separate from the social networking system 130 in that they may be operated by different entities. In various embodiments, however, the social networking system 130 and the external systems 120 operate in conjunction to provide social networking services to users (or members) of the social networking system 130. In this sense, the social networking system 130 provides a platform, or backbone, which other systems, such as external systems 120, may use to provide social networking services and functionalities to users across the Internet.

The user device 110 comprises one or more computing devices that can receive input from a user and can transmit and receive data via the network 140. In one embodiment, the user device 110 is a conventional computer system executing, for example, a Microsoft Windows compatible operating system (OS), Apple OS X, and/or a Linux distribution. In another embodiment, the user device 110 can be a device having computer functionality, such as a smartphone, a tablet, a personal digital assistant (PDA), a mobile telephone, etc. The user device 110 is configured to communicate via the network 140. The user device 110 can execute an application, for example, a browser application that allows a user of the user device 110 to interact with the social networking system 130. In another embodiment, the user device 110 interacts with the social networking system 130 through an application programming interface (API) that runs on the native operating system of the user device 110, such as iOS and ANDROID. The user device 110 is configured to communicate with the external system 120 and the social networking system 130 via the network 140, which may comprise any combination of local area and/or wide area networks, using wired and/or wireless communication systems.

In one embodiment, the network 140 uses standard communications technologies and/or protocols. Thus, the network 140 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 140 can include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). The data exchanged over the network 140 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 110 may display content from the external system 120 and/or from the social networking system 130 by processing a markup language document 114 received from the external system 120 and from the social networking system 130 using a browser application 112. The markup language document 114 identifies content and one or more instructions describing formatting or presentation of the content. By executing the instructions included in the markup language document 114, the browser application 112 displays the identified content using the format or presentation described by the markup language document 114. For example, the markup language document 114 includes instructions for generating and displaying a web page having multiple frames that include text and/or image data retrieved from the external system 120 and the social networking system 130. In various embodiments, the markup language document 114 comprises a data file including extensible markup language (XML) data, extensible hypertext markup language (XHTML) data, or other markup language data. Additionally, a markup language document 114 may include JavaScript Object Notation (JSON) data, JSON with padding (JSONP), and JavaScript data to facilitate data-interchange between the external system 120 and the user device 110. The browser application 112 on the user device 110 may use a JavaScript compiler to decode such a markup language document 114.

In one embodiment, the user device 110 also includes one or more cookies 116 including data indicating whether a user of the user device 110 is logged into the social networking system 130, which may enable customization of the data communicated from the social networking system 130 to the user device 110.

The external system 120 includes one or more web servers including one or more web pages 122a, 122b, which are communicated to the user device 110 using the network 140. The external system 120 is separate from the social networking system 130. For example, the external system 120 is associated with a first domain while the social networking system 130 is associated with a separate social networking domain. Web pages 122a, 122b included in the external system 120 comprise markup language documents identifying content and including instructions specifying formatting or presentation of the identified content.

The social networking system 130 comprises one or more computing devices storing a social network, or a "social graph," including a plurality of users and providing users of the social network with the ability to communicate and interact with other users of the social network. The social networking system 130 is further described below. In use, users join the social networking system 130 and then add connections to any number of other users of the social networking system 130 to whom they desire to be connected. As used herein, the term "friend" refers to any other user of the social networking system 130 to whom a user has formed a connection, association, or relationship via the social networking system 130.

Connections may be added explicitly by a user or may be automatically created by the social networking systems 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral ("two-way"), or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees of separation.

In addition to establishing and maintaining connections between users and allowing interactions between users, the social networking system 130 provides users with the ability to take actions on various types of items supported by the social networking system 130. These items may include groups or networks (where "networks" here refer not to physical communication networks, but rather social networks of people, entities, and concepts) to which users of the social networking system may belong, events or calendar entries in which a user might be interested, computer-based applications that a user may use via the social networking system 130, transactions that allow users to buy or sell items via the service, and interactions with advertisements that a user may perform on or off the social networking system. These are just a few examples of the items upon which a user may act on a social networking system, and many others are possible. A user may interact with anything that is capable of being represented in the social networking system 130 or in the external system 120, separate from the social networking system 130, coupled to the social networking system 130 via the network 140.

The social networking system 130 is also capable of linking a variety of entities. For example, the social networking system 130 enables users to interact with each other as well as external systems 120 or other entities through an API or other communication channels. The social networking system 130 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, events, messages, concepts, and any other things that can be represented by an object in the social networking system 130. Other types of nodes in the social graph are relevant in the determination of image similarity by the social networking system 130. As discussed in more detail below, these node types include images, buckets in a coordinate system into which hash values of images may fall, cluster centers grouping similar images, as well as users linked to images. An edge between two nodes in the social graph represents a particular kind of connection, or association, between the two nodes, which may result from node relationships or from an action that was performed by one of the nodes on the other node. For example, when a first user identifies a second user as a friend, an edge in the social graph is generated connecting a node representing the first user and a second node representing the second user. As various nodes relate or interact with each other, the social networking system 130 modifies edges connecting the various nodes to reflect the relationships and interactions.

As further examples of node relationships relevant to the determination of image similarity, buckets may be associated with cluster centers, a cluster center may be associated with images, and images may be associated with users. These associations may be one-way or two-way. In an embodiment of the invention, the associations between buckets and cluster centers are one-way from buckets to cluster centers, the associations between a cluster center and images are two-way, and the associations between images and users are two-way. The social networking system 130 may use the associations, for example, to identify similar images and to perform certain administrative actions on those images, as discussed in more detail below. As another example, if a user proposes posting of a particular new image to the social networking system 130, the social networking system 130 may determine the possible similarity of the new image with other images maintained by it. The user and the new image may be treated as nodes with an edge between them representing their connection.

The social networking system 130 also includes user-generated content, which enhances a user's interactions with the social networking system 130. User-generated content may include anything a user can add, upload, send, or "post," to the social networking system 130. For example, a user communicates posts to the social networking system 130 from a user device 110. Posts may include data such as status updates or other textual data, location information, images such as photos, videos, links, music or other similar data and/or media. Content may also be added to the social networking system 130 by a third-party. Content "items" are represented as objects in the social networking system 130. In this way, users of the social networking system 130 are encouraged to communicate with each other by posting text and content items of various types of media through various communication channels, increasing the interaction of users with each other and increasing the frequency with which users interact with the social networking system 130.

Users may desire to post images to the social networking system 130 to share information about themselves or their interests. Such images may be photos or any other types of content items. To increase communications among users, the social networking system 130 may encourage or invite users to post images that depict or otherwise appropriately reflect their individuality and unique interests. To ensure that uploaded images are both unique and otherwise appropriate for the social networking system 130, the social networking system 130 may control or restrict the publication of images by users in some circumstances. For example, when an image associated with a user is too similar to or identical with another image associated with another user, the social networking system 130 may control or restrict publication of the image. As another example, the social networking system 130 may determine that a particular image is inappropriate for publication because its content violates a guideline or other standard. In that situation, the social networking system 130 may control or restrict publication of the image and all similar or identical images. To manage the publication of images, the social networking system 130 includes an image similarity analysis module 132, as discussed in more detail below.

Figure 2:
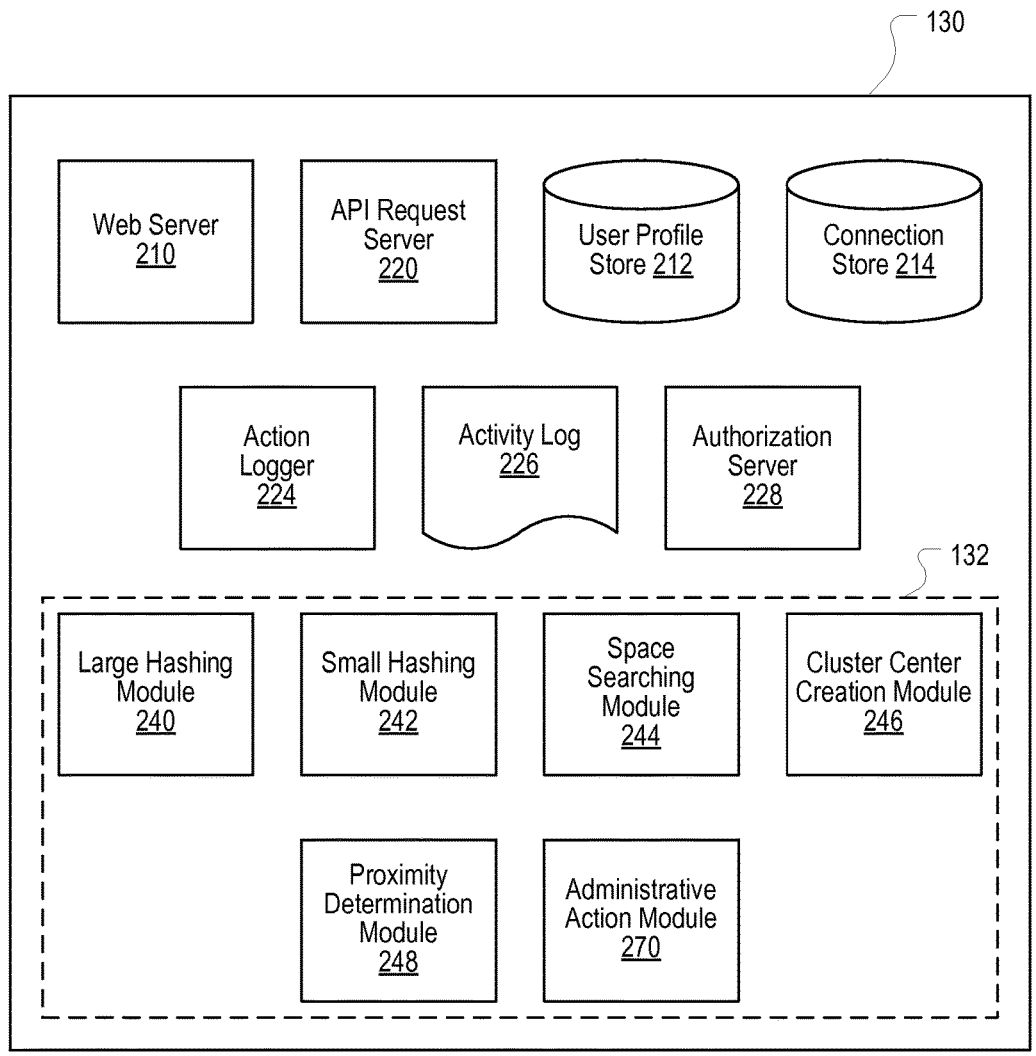
FIG. 2 is diagram of the social networking system in accordance with an embodiment of the invention.

FIG. 2 is a diagram of the social networking system 130 of FIG. 1 in accordance with an embodiment of the invention. In the embodiment shown in FIG. 2, the social networking system 130 includes the image similarity analysis module 132, a web server 210, an action logger 224, an API request server 220, an activity log 226, a user profile store 212, a connection store 214, and an authorization server 228. The image similarity analysis module 132 includes a large hashing module 240, a small hashing module 242, a space searching module 244, a cluster center creation module 246, a proximity determination module 248, and an administrative action module 270. In an embodiment of the invention, the functions performed by the modules shown in FIG. 2 may be variously replaced by, combined with, or integrated into other modules or components. In an embodiment of the invention, the social networking system 130 may include additional, fewer, or different modules for various applications. Other modules such as network interfaces, security mechanisms, load balancers, failover servers, management and network operations consoles, and the like are not shown so as to not obscure the details of the system.

User profiles include biographic, demographic, and other types of descriptive information, such as work experience, educational history, hobbies or preferences, location, and the like that has been declared by users or inferred by the social networking system 130. This information is stored in the user profile store 212 such that each user is uniquely identified. The social networking system 130 also stores data describing one or more connections between different users in the connection store 214. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 130, such as non-person entities, buckets, cluster centers, images, interests, pages, external systems, concepts, and the like are also stored in the connection store 214.

The social networking system 130 maintains data about objects with which a user may interact. To maintain this data, the user profile store 212 and the connection store 214 store instances of the corresponding type of objects maintained by the social networking system 130. Each object type has information fields that are suitable for storing information appropriate to the type of object. For example, the user profile store 212 contains data structures with fields suitable for describing a user's profile. When a new object of a particular type is created, the social networking system 130 initializes a new data structure of the corresponding type, assigns a unique object identifier to it, and begins to add data to the object as needed. This might occur, for example, when a user becomes a user of the social networking system 130, and the social networking system 130 generates a new instance of a user profile in the user profile store 212, assigns a unique identifier to the user profile, and begins to populate the fields of the user profile with information provided by the user.

The connection store 214 includes data structures suitable for describing a user's connections to other users, connections to external systems 120 or connections to other entities. The connection store 214 may also associate a connection type with a user's connections, which may be used in conjunction with the user's privacy setting to regulate access to information about the user. In an embodiment of the invention, the user profile store 212 and the connection store 214 may be implemented as a federated database.

Data stored in the connection store 214, the user profile store 212 and the activity log 226 enables the social networking system 130 to generate the social graph that uses nodes to identify various objects and edges connecting nodes to identify relationships between different objects. For example, if a first user establishes a connection with a second user in the social networking system 130, user profiles of the first user and the second users from the user profile store 212 may act as nodes in the social graph. The connection between the first user and the second user stored by the connection store 214 is an edge between the nodes associated with the first user and the second user. Continuing this example, the second user may then send the first user a message within the social networking system 130. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented as a node in the social networking system 130. This tagging action may create edges between the first user and the second user as well as create an edge between each of the users and the image, which is also a node in the social graph. In yet another example, if a user confirms attending an event, the user and the event are nodes obtained from the user profile store 212, where the attendance of the event is an edge between the nodes that may be retrieved from the activity log 226. By generating and maintaining the social graph, the social networking system 130 includes data describing many different types of objects and the interactions and connections among those objects, providing a rich source of socially relevant information.

The web server 210 links the social networking system 130 to one or more user devices 110 and/or one or more external systems 120 via the network 140. The web server 210 serves web pages, as well as other web-related content, such as Java, JavaScript, Flash, XML, and so forth. The web server 210 may include a mail server or other messaging functionality for receiving and routing messages between the social networking system 130 and one or more user devices 110. The messages can be instant messages, queued messages (e.g., email), text and SMS messages, or any other suitable messaging format.

The API request server 220 allows one or more external systems 120 and user devices 110 to access information from the social networking system 130 by calling one or more APIs. The API request server 220 may also allow external systems 120 to send information to the social networking system 130 by calling APIs. The external system 120, in one embodiment, sends an API request to the social networking system 130 via the network 140, and the API request server 220 receives the API request. The API request server 220 processes the request by calling an API associated with the API request to generate an appropriate response, which the API request server 220 communicates to the external system 120 via the network 140. For example, responsive to an API request, the API request server 220 collects data associated with a user, such as the user's connections that have logged into the external system 120, and communicates the collected data to the external system 120. In another embodiment, the user device 110 communicates with the social networking system 130 via APIs in the same manner as external systems 120.

The action logger 224 is capable of receiving communications from the web server 210 about user actions on and/or off the social networking system 130. The action logger 224 populates the activity log 226 with information about user actions, enabling the social networking system 130 to discover various actions taken by its users within the social networking system 130 and outside of the social networking system 130. Any action that a particular user takes with respect to another node on the social networking system 130 is associated with each user's profile, through information maintained in the activity log 226 or in a similar database or other data repository. Examples of actions taken by a user within the social networking system 130 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 130, the action is recorded in the activity log 226. In one embodiment, the social networking system 130 maintains the activity log 226 as a database of entries. When an action is taken within the social networking system 130, an entry for the action is added to the activity log 226. The activity log 226 may be referred to as an action log.

Additionally, user actions may be associated with concepts and actions that occur within an entity outside of the social networking system 130, such as an external system 120 that is separate from the social networking system 130. For example, the action logger 224 may receive data describing a user's interaction with an external system 120 from the web server 210. In this example, the external system 120 reports a user's interaction according to structured actions and objects in the social graph.

Other examples of actions where a user interacts with an external system 120 include a user expressing an interest in an external system 120 or another entity, a user posting a comment to the social networking system 130 that discusses an external system 120 or a web page 122a within the external system 120, a user posting to the social networking system 130 a Uniform Resource Locator (URL) or other identifier associated with an external system 120, a user attending an event associated with an external system 120 or any other action by a user that is related to an external system 120. Thus, the activity log 226 may include actions describing interactions between a user of the social networking system 130 and an external system 120 that is separate from the social networking system 130.

The authorization server 228 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 120, or any entity that can potentially access the information. The information that can be shared by a user comprises user profile information like profile photo, phone numbers associated with the user, user's connections, actions taken by the user such as adding a connection, changing user profile information, and the like.

The privacy setting specification may be provided at different levels of granularity. For example, the privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 120. One embodiment allows the specification of the set of entities to comprise an enumeration of entities. For example, the user may provide a list of external systems 120 that are allowed to access certain information. Another embodiment allows the specification to comprise a set of entities along with exceptions that are not allowed to access the information. For example, a user may allow all external systems 120 to access the user's work information but specify a list of external systems 120 that are not allowed to access the work information. Certain embodiments call the list of exceptions that are not allowed to access certain information a "block list." External systems 120 belonging to a block list specified by a user are blocked from accessing the information specified in the privacy setting. Various combinations of granularity of specification of information and granularity of specification of entities with which information is shared are possible. For example, all personal information may be shared with friends whereas all work information may be shared with friends of friends.

The authorization server 228 contains logic to determine if certain information associated with a user can be accessed by a user's friends, external systems 120 and/or other applications and entities. The external system 120 may need authorization from the authorization server 228 to access the user's more private and sensitive information, such as the user's work phone number. Based on the user's privacy settings, the authorization server 228 determines if another user, the external system 120, an application, or another entity is allowed to access information associated with the user, including information about actions taken by the user.

The image similarity analysis module 132 may determine the similarity of images provided to the social networking system 130, and associate the images based on their similarity to perform administrative actions. As used herein, similarity between two or more images refers to image content that, according to a threshold, is identical or nearly identical. For image comparison, the large hashing module 240 computes a "large" hash value for an image, which may be checked for similarity with other images in the social networking system 130. A large hash value is a representation of an image, which may comprise pixels represented by bits. The large hash value may comprise a set of values. In an embodiment of the invention, the large hashing module 240 may use a content-aware hashing function to compute the large hash value for the image.

To facilitate comparison between images, the small hashing module 242 computes a "small" hash value of the large hash value by projecting the large hash value onto a d-dimensional (d-D) coordinate system having reduced dimensions, where d is the number of dimensions of the coordinate system and may be any integer value of one or greater. A small hash value is a more compact representation of an image and may comprise a set of values. In an embodiment of the invention, the small hashing module 242 may apply a locality-sensitive hashing function to the large hash value to compute the small hash value. The projection of the large hash value results in the small hash value falling within a bucket of the coordinate system. A bucket is a smallest unit of a coordinate system. For example, a bucket may be a smallest segment in a 1-D coordinate system, a smallest square in a 2-D coordinate system, or a smallest cube in a 3-D coordinate system.

The space searching module 244 may determine the space in the coordinate system to search for cluster centers associated with possible similar images. A cluster center is a point in a coordinate system to which images deemed to be similar are associated. In an embodiment of the invention, the space searching module 244 may search for cluster centers only in the bucket within which the small hash value falls. Searching within the same bucket for possibly similar images avoids an incorrect assumption that all images associated with small hash values that fall within the same bucket are similar. In an embodiment of the invention, the space searching module 244 may also identify adjacent buckets and search for cluster centers associated with similar images in the adjacent buckets. The adjacent buckets may include buckets that coincide with a vertex of the coordinate system closest to the small hash value. Searching in multiple buckets for possibly similar images avoids an incorrect assumption that images associated with small hash values that fall within different buckets are different. The space searching module 244 achieves computational efficiencies by not searching for cluster centers in all of the buckets of the coordinate system.

The cluster center creation module 246 may create cluster centers associated with buckets and images. For a first image received by the social networking system 130, the cluster center creation module 246 creates a first cluster center associated with the first image. When the distance (e.g., the Euclidian distance) between a small hash value associated with a second image and the first cluster center is determined to exceed a threshold distance, then the cluster creation module 246 may create a second cluster center for the second image. Otherwise, the second image is associated with the first cluster center, and a new cluster center is not created for the second image, as described in more detail below. Each cluster center represents one or more images deemed to be similar.

The proximity determination module 248 may determine the distance between a small hash value associated with an incoming image and a cluster center for one or more existing images maintained in the social networking system 130. To analyze whether the images are similar, the proximity determination module 248 may (i) compute the distance between the small hash value of the incoming image and the cluster center of the existing image(s) and (ii) compare the computed distance against a threshold distance. The proximity determination module 248 effectively applies a radius around the small hash value, with the radius being determined by the threshold distance. The value of the threshold distance (and radius) is configurable, and may be determined by, for example, the proximity determination module 248 or an administrator of the social networking system 130. The proximity determination module 248 determines when the cluster center falls within the radius and when it falls outside the radius. When the computed distance is less than the threshold distance, the incoming image is associated with the cluster center of the existing image(s). Conversely, when the computed distance is more than the threshold distance, the cluster center creation module 246 creates a new cluster center associated with the small hash value of the incoming image.

The administrative action module 270 allows an administrator of the social networking system 130 to manage images based on the association of similar images. For example, the administrative action module 270 allows for the takedown and blocking of similar images.

The features and functionality of the large hashing module 240, the small hashing module 242, the space searching module 244, the cluster center creation module, 246, the proximity determination module 248, and the administrative action module 270 is described in more detail below.

Hashing Functions

In certain circumstances, the social networking system 130 may desire to control or prevent publication of copied images. For example, the social networking system 130 may encourage or require each user to post content that is unique to the user. As another example, the social networking system 130 may limit or restrict the posting of an inappropriate image and all similar images. The identification of images similar to a particular image may be achieved by comparing the image against each of the existing images stored in the social networking system 130. However, because the number of existing images may be large and each image may contain many pixels, comparing the particular image against each existing image may be computationally intensive and hence impractical.

Images can be analyzed for similarity by applying one or more hashing functions. A hashing function is a function that receives an input value (which may comprise many information bits) and maps it to a hash value (which may comprise fewer bits than the input value). Some hashing functions used for images are "content aware." Hashing functions that are content-aware have a characteristic that, when two images are similar in content, the images are mapped to similar hash values. When the distance between two hash values of two images is relatively small, the images may be considered similar. For example, a content-aware hashing function may be applied to a first image of an apple to obtain a first hash value, applied to a second image of another apple to obtain a second hash value, and applied to a third image of a dog to obtain a third hash value. In this example, the first hash value of the first image and the second hash value of the second image are more likely to be close in distance because the content depicted in the first image and the second image is similar. In contrast, the first hash value of the first image and the third hash value of the third image are less likely to be close in distance because the content depicted in the first image and the third image is different. Likewise, the second hash value of the second image and the third hash value of the third image are less likely to be close in distance because the content depicted in the second image and the third image is different.

Images may be hashed with a content-aware hashing function to obtain "large" hash values for these images. For example, a content-aware hashing function may hash an image containing thousands or millions of pixels to a large hash value comprising hundreds of values. A large hash value thus may be represented by a set of values, with the number of values in the set corresponding to the number of dimensions of the content-aware hashing function. Although the content-aware hashing function can substantially reduce the amount of information used to represent the image, the large hash value still contains a relatively large amount of information. Hence, it may be computationally expensive to compare, i.e., calculate the distance between, large hash values of a large number of images to identify similar images. The determination of possible similarity between images may be especially costly in terms of computational resources when the number of dimensions of the large hash values is large or when a significant number of images require comparison. For example, to determine whether a particular image is similar to any other images of a social networking system, large hash values for millions or billions of images may need to be computed and then compared, posing significant computational expense.

Locality-sensitive hashing (lsh) may be used to address computational expense. Locality-sensitive hashing may be applied to a large hash value having a relatively large number of dimensions to obtain a "small" hash value having fewer dimensions. For example, locality-sensitive hashing may hash a large hash value having hundreds of dimensions to a small hash value having few (e.g., two or three) dimensions. A small hash value may comprise a few values whereas a large hash value may comprise many values.

For an image x and an image y, locality-sensitive hashing produces small hash values from large hash values with the following properties:

when $lsh(hx)=lsh(hy)$:

$d(hx, hy)<R$ with high probability;

$d(hx, hy)>cR$ with low probability where
hx is a large hash value of image x,
hy is a large hash value of image y,
lsh(hx) is a small hash value of hx,
lsh(hy) is a small hash value of hy,
d(hx, hy) is Euclidean distance between hx and hy.
The small hash values lsh(hx) and lsh(hy) result from locality-sensitive hashing of large hash values hx and hy, respectively. According to the properties of locality-sensitive hashing, when the small hash values lsh(hx) and lsh(hy) are equal, the Euclidean distance between the large hash values hx and hy is less than, for example, a suitable value R with high probability. Also, when the small hash values lsh(hx) and lsh(hy) are equal, the Euclidean distance between the large hash values hx and hy is greater than, for example, a suitable value R multiplied by a factor c with low probability. These properties reflect similarity between the images x and y when the small hash values lsh(hx) and lsh(hy) are equal.

Locality-sensitive hashing reduces the number of dimensions of large hash values by projecting large hash values onto one or more vectors of a coordinate system having a smaller number of dimensions than the large hash values. Each vector represents a different axis of the coordinate system and corresponds to one dimension of the coordinate system. The vectors of the coordinate system may or may not be orthogonal to one another. Reduction in the number of dimensions of the large hash values through projection enables more efficient comparison of small hash values to determine image similarity. In locality-sensitive hashing, large hash values may be projected to segments of one or multiple vectors. The segments of vectors in which small hash values may fall map to buckets in the corresponding coordinate system. Thus, projection of large hash values associated with images results in small hash values falling into certain buckets.

Figure 3A:
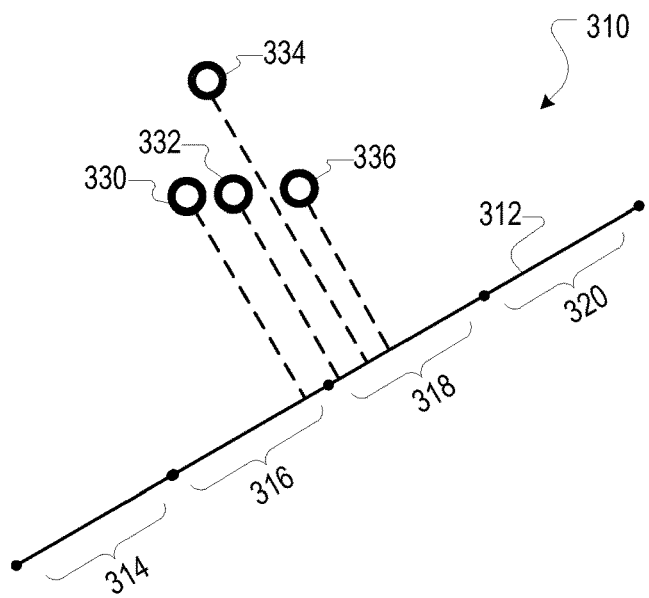
FIGS. 3A-3B illustrate projections of large hash values of images onto vectors in accordance with an embodiment of the invention.

FIG. 3A illustrates a projection 310 of four large hash values onto a single vector 312 of a 1-D coordinate system. The vector 312 is divided into a number of segments, with four segments 314, 316, 318, 320 being shown in FIG. 3A. In a 1-D coordinate system, each segment may be considered as a bucket. Four large hash values 330, 332, 334, 336 representing four images are projected onto the vector 312 and fall within certain buckets thereof. The large hash value 330 is projected onto the vector 312 and falls within the bucket 316. The large hash values 332, 334, 336 are projected onto the vector 312 and fall within the bucket 318. Although not labeled in FIG. 3A, four small hash values, which correspond to the four large hash values 330, 332, 334, 336, are represented by the four points on the vector 312 at which the four dashed lines terminate.

Conventionally, images associated with large hash values that project onto the same bucket are considered to be similar, and images associated with large hash values that project onto different buckets are considered to be different (i.e., not similar). In the example shown in FIG. 3A, the large hash values 332, 334, 336 project onto the same bucket 318, and their corresponding images would be deemed similar. Conversely, the large hash values 330, 332 project onto different buckets 316, 318, respectively, and their corresponding images would be deemed different. Deciding whether images are similar or not based solely on the buckets onto which their large hash values project can often lead to erroneous results, as described below.

In the example shown in FIG. 3A, the large hash value 334 is relatively far from the large hash values 330, 332, 336. The relatively small separation among the large hash values 330, 332, 336 signifies that the corresponding images of these large hash values are likely to be similar. The relatively large separation between the large hash value 334 and the large hash values 330, 332, 336 signifies that the corresponding image of the large hash value 334 is likely to be different from the corresponding images of the large hash values 330, 332, 336. Thus, projection of the large hash value 334 to fall within the same bucket 318 as the large hash values 332, 336 should not conclusively signify that their corresponding images are similar. As another example, the large hash value 330 is relatively close to the large hash value 332. The relatively small separation between the large hash values 330, 332 signifies that their corresponding images are likely to be similar. Thus, projection of the large hash value 330 and the large hash values 332, 336 to fall within different buckets, i.e., the bucket 316 and the bucket 318 respectively, should not conclusively signify that their corresponding images are different.

As shown by the example in FIG. 3A, the image associated with the large hash value 334 may be erroneously determined to be similar to the images associated with the large hash values 332, 336 because these large hash values project to the same bucket 318. Furthermore, the image associated with the large hash value 330 may be erroneously determined to be different from the image associated with the large hash value 332 because these large hash values project to different buckets 316, 318. These errors result from, for example: (i) mapping a large hash value having possibly many dimensions to a small hash value having only one dimension in the 1-D coordinate system in FIG. 3A and (ii) quantization of a small hash value into one of the segments of the vector 312.

In general, large hash values may be projected onto d vectors in a d-D coordinate system, where d may be any integer value. The use of multiple vectors instead of one vector in projections involving locality-sensitive hashing may provide more accurate identifications of similar images and different images. Generally, when more vectors are used in projections, determinations regarding image similarity and differences are more accurate.

Figure 3B:
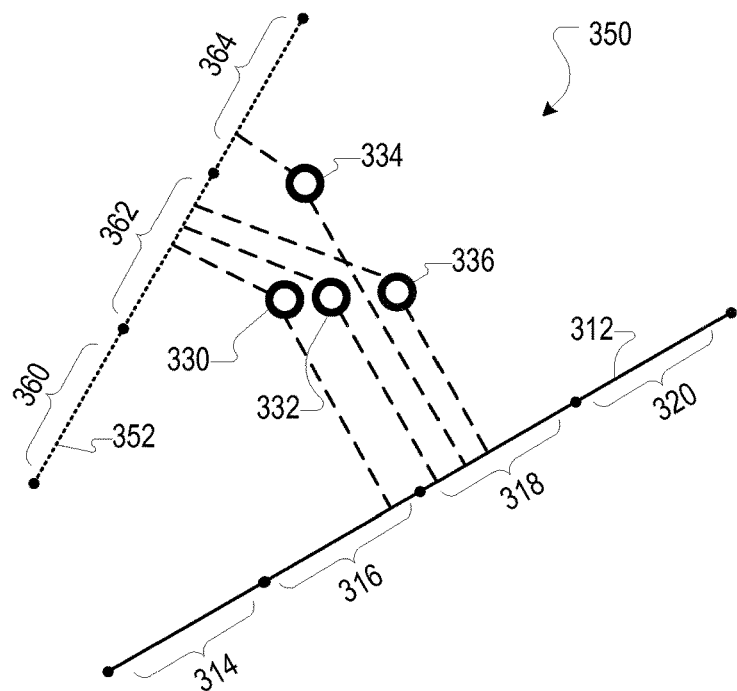

FIG. 3B illustrates a projection 350 of large hash values onto two vectors 312, 352 of a 2-D coordinate system to better determine image similarity and differences. The vector 312 is divided into a number of segments, with the four segments 314, 316, 318, 320 being shown in FIG. 3B. The vector 352 is also divided into a number of segments, with three segments 360, 362, 364 being shown in FIG. 3B. Four large hash values 330, 332, 334, 336 are projected onto the vector 312 and also onto the vector 352, and fall within certain segments of each vector. The large hash value 334 is projected onto the vector 352 and falls within the segment 364. The large hash values 330, 332, 336 are projected onto the vector 352 and fall within the segment 362. Although not labeled in FIG. 3B, a small hash value corresponding to each large hash value is represented by (i) a first point on the vector 312 at which a first dashed line for the large hash value terminates and (ii) a second point on the vector 352 at which a second dashed line for the large hash value terminates. Each small hash value comprises two values on the vectors 312, 352. A bucket is a rectangle with one side defined by a segment on vector 312 and another sided defined by a segment on vector 352.

In certain cases, projection of the large hash value 334 and the large hash values 330, 332, 336 to fall within different segments of the vector 352, i.e., the segment 364 and the segment 362 respectively, may more accurately signify that the corresponding image of the large hash value 334 is different from the corresponding images of the large hash values 330, 332, 336. Likewise, in certain cases, projection of the large hash values 330, 332, 336 to fall within the same segment 362 may more accurately signify that the corresponding images of the large hash values 330, 332, 336 are similar.

It is often assumed that large hash values projected into different buckets means that their corresponding images are different and that large hash values projected into the same bucket means that their images are similar. However, even for projections involving more than one vector (shown in FIG. 3B), these assumptions are often incorrect. Locality-sensitive hashing of a large hash value reduces the number of dimensions of the large hash value. This reduction results in loss of information. When the reduction in the number of dimensions is large, the loss of information may be large and the probability increases that small hash values will be similar even when their corresponding images are actually different. Thus, different images may be incorrectly deemed to be similar because their small hash values are similar or fall into the same bucket. This type of error is often referred to as "false positives." Further, based on arbitrary coordinate definitions that determine the boundary of a bucket, similar images may be incorrectly deemed to be different because their small hash values fall into different buckets. This type of error is often referred to as "false negatives."

Determination of False Positives

FIGS. 4A-4E graphically illustrate creation of multiple cluster centers associated with a bucket in accordance with an embodiment of the invention. Each cluster center may be associated with one or more images that are deemed to be similar. In an embodiment of the invention, each cluster center may also be associated with one or more buckets. The ability to associate multiple cluster centers with one bucket avoids error in assumptions that all small hash values that fall within the same bucket correspond to similar images. The multiple cluster centers associated with one bucket allow for distinctions among similar and non-similar images associated with small hash values that may fall within the same bucket. In this way, the problem of false positives may be addressed.

In an embodiment of the invention, a large hash value is first generated for an image by applying a content-aware hashing function to the image. A small hash value is next generated for the image by applying locality-sensitive hashing to the large hash value. Locality-sensitive hashing involves projection of the large hash value onto one or more vectors. Such projection involves reduction of the large hash value from a dimension number k to a dimension number d. The reduction may be performed by matrix multiplication, as follows:

$$u = Hv$$

where v denotes a set of k values representing the large hash value, H denotes a matrix having dimensions (d×k), and u denotes a set of d values representing the small hash value. In an embodiment of the invention, the set of k values and the set of d values may be real numbers, integers, a combination thereof, or any other suitable type of value. As shown by the equation above, the large hash value is multiplied with the (d×k) matrix H to obtain the small hash value. In effect, a dot product is performed between set v for the large hash value and each row of matrix H to obtain a corresponding value in set u for the small hash value. Each row of matrix H corresponds to one vector in a d-D coordinate system. The matrix multiplication results in projection of the large hash value onto a number of vectors equal to the dimension number d. In an embodiment of the invention, when multiple vectors are used in projection, the multiple vectors may be orthogonal to one another. Each vector of the d-D coordinate system is divided into a number of segments. A bucket is defined by d segments of the d vectors (i.e., one segment of each vector) of the d-D coordinate system.

In an embodiment of the invention, dimension number d is selected to have a value of 3 and the total number of buckets is $10^9$. In another embodiment of the invention, dimension number d is selected to have a value other than 3. In an embodiment of the invention, the total number of segments for a vector may be $10^3$ and thus the total number of buckets is $10^{3*d}$. For purposes of illustration, projections shown herein are simplified examples of locality-sensitive hashing in two dimensions, i.e., when dimension number d is selected to have a value of 2.

Figure 4A:
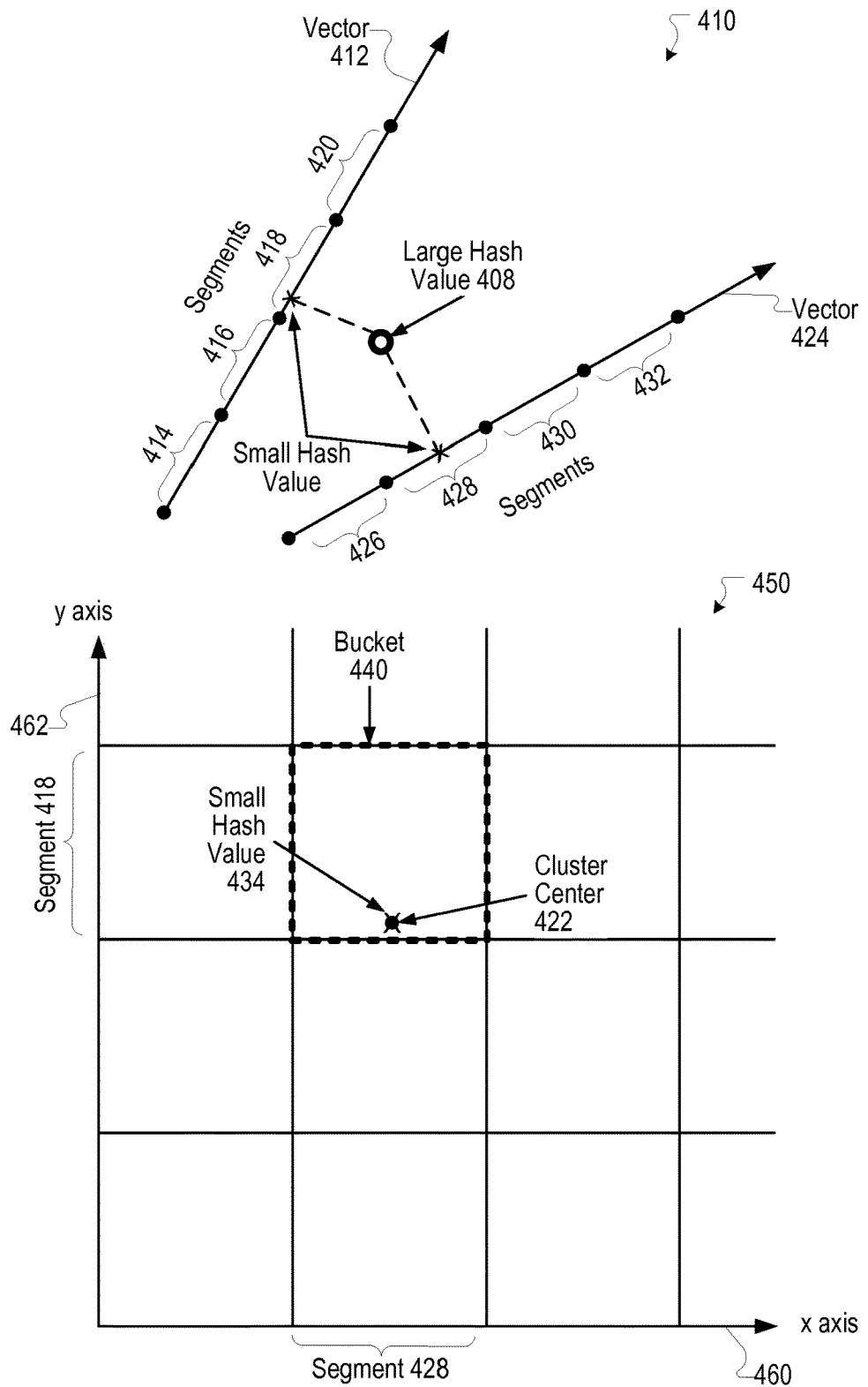
FIGS. 4A-4E are graphical representations of locality-sensitive hashing of images and related mappings to account for false positives in accordance with an embodiment of the invention.

FIG. 4A is a graphical representation of a projection 410 for locality-sensitive hashing and a related mapping 450 in a 2-D coordinate system, which illustrate creation of a first cluster center associated with a new image in accordance with an embodiment of the invention. The large hashing module 240 in FIG. 2 generates a large hash value 408 associated with a new image p1 (not shown in FIG. 4A). A new image may be, for example, an image proposed for posting to the social networking system 130. The small hashing module 242 in FIG. 2 projects the large hash value 408 onto a vector 412 and a vector 424. The vector 412 is divided into a number of segments, with four segments 414, 416, 418, 420 being shown in FIG. 4A. The vector 424 is divided into a number of segments, with four segments 426, 428, 430, 432 being shown in FIG. 4A. The small hashing module 242 projects the large hash value 408 to fall within the segment 418 of the vector 412. The small hashing module 242 also projects the large hash value 408 to fall within the segment 428 of the vector 424.

The mapping 450 in the 2-D coordinate system shows a graphical representation of the projection 410. The 2-D coordinate system includes an x axis 460 that corresponds to the vector 424, and a y axis 462 that corresponds to the vector 412. The x axis 460 is divided into units corresponding to the segments of vector 424. The y axis 462 is also divided into units corresponding to the segments of vector 412. The segments of the vectors 412, 424 define buckets in the 2-D coordinate system. For example, the segment 418 of the vector 412 and the segment 428 of the vector 424 define a bucket 440 in the 2-D coordinate system. A small hash value 434 associated with the image p1 falls within the bucket 440. The small hash value 434 comprises (i) an x value corresponding to the point at which a dashed line from the large hash value 408 terminates on the vector 424 and (ii) a y value corresponding to the point at which a dashed line from the large hash value 408 terminates on the vector 412.

To search for images similar to the image p1, the space searching module 244 in FIG. 2 first determines whether any cluster centers are associated with the bucket 440. Because no cluster centers are associated with the bucket 440, the cluster center creation module 246 creates a first cluster center 422 based on the small hash value 434. In an embodiment of the invention, when the small hashing module 242 determines that a small hash value associated with a new image falls within a bucket, the space searching module 244 performs a search for cluster centers associated with images similar to the new image in the same bucket. By limiting the search to cluster centers in one bucket, the space searching module 244 optimizes the search process, allowing the search to be conducted more rapidly and efficiently.

In another embodiment of the invention, the space searching module 244 may define the parameters of the search to include other buckets in the coordinate system in addition to the bucket within which the small hash value of the new image falls, as discussed in more detail below.

Figure 4B:
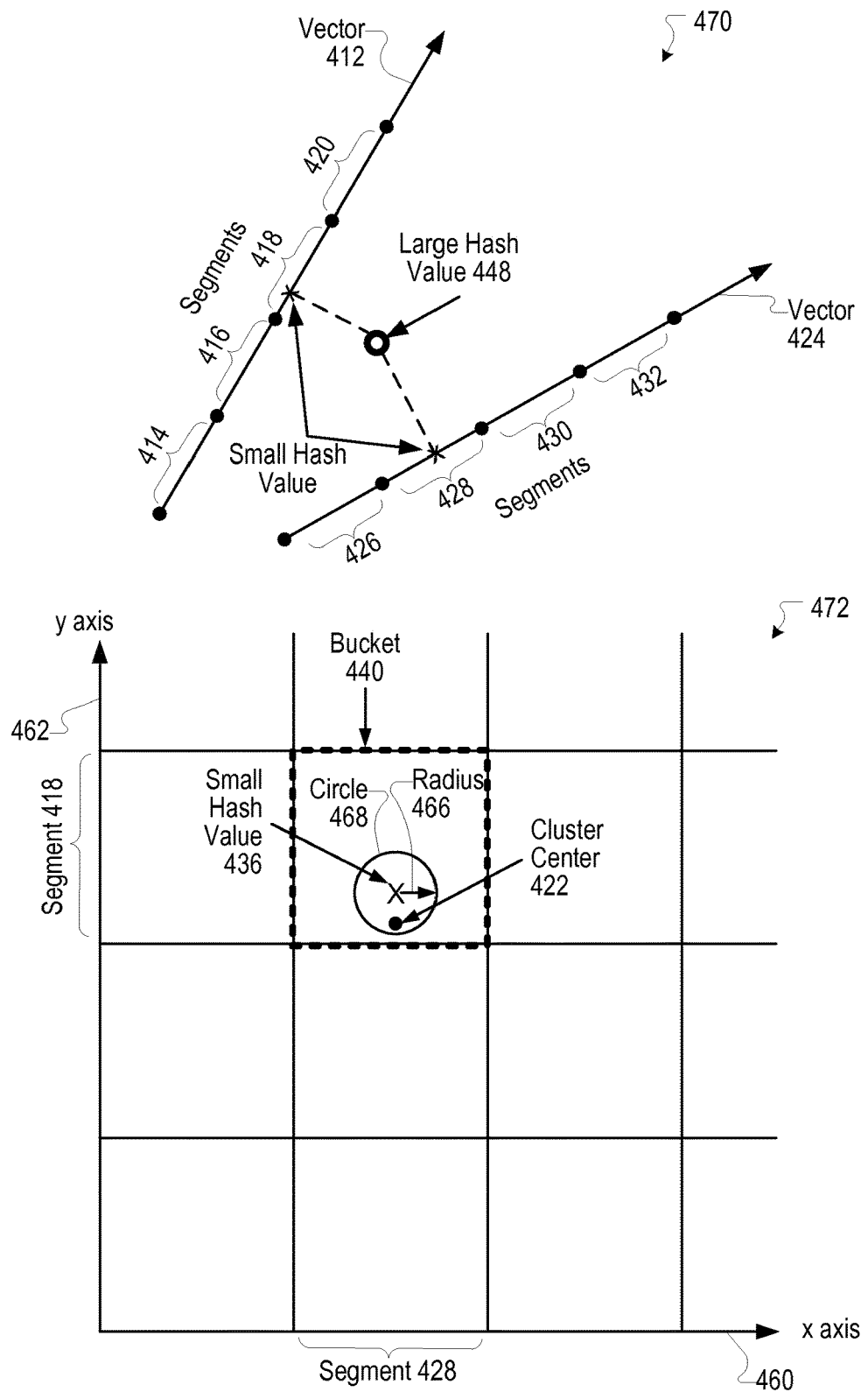

FIG. 4B is a graphical representation of a projection 470 for locality-sensitive hashing and a related mapping 472 in the 2-D coordinate system, which illustrate association of a new image to a preexisting cluster center in accordance with an embodiment of the invention. The large hashing module 240 generates a large hash value 448 associated with a new image p2. The small hashing module 242 projects the large hash value 448 onto the vector 412 and the vector 424. The small hashing module 242 projects the large hash value 448 to fall within the segment 418 of the vector 412 and within the segment 428 of the vector 424.

Figure 4C:
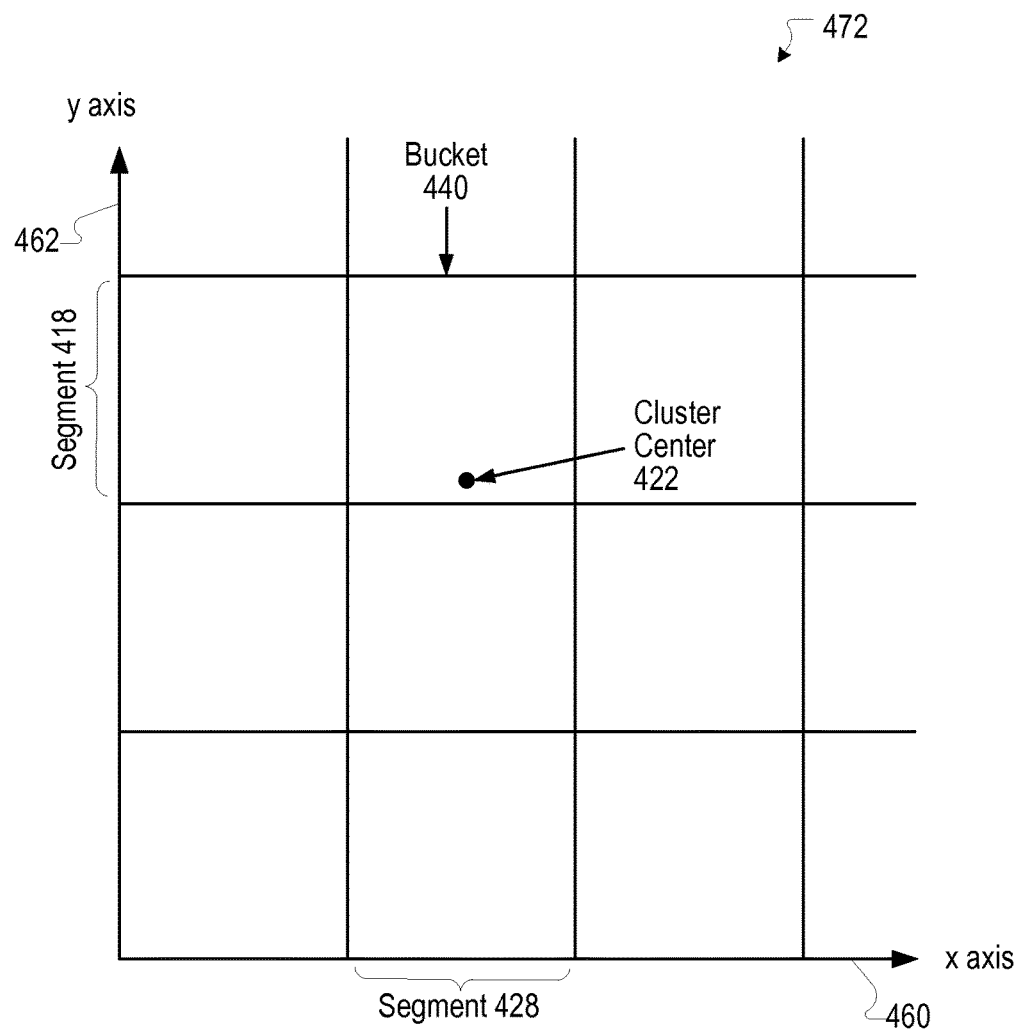

The mapping 472 in the 2-D coordinate system shows a graphical representation of the projection 470. The small hashing module 242 determines that a small hash value 436 associated with the image p2 falls within the bucket 440. To search for images similar to image p2, the space searching module 244 first determines whether any cluster centers are associated with the bucket 440. Because the cluster center 422 is associated with the bucket 440, the proximity determination module 248 in FIG. 2 determines whether the cluster center 422 is sufficiently close in distance to the small hash value 436. The proximity determination module 248 computes the distance between the small hash value 436 and the cluster center 422. The proximity determination module 248 then determines whether the computed distance is less than a threshold distance. If the computed distance is less than the threshold distance (which is the case in FIG. 4B), then the image p2 is deemed to be similar to the image p1, and the image p2 is associated with the cluster center 422. A new cluster center is not created, as shown in FIG. 4C. Conversely, if the computed distance exceeds the threshold distance (not shown in FIG. 4B), then the image p2 is deemed to be different from the image p1, and the cluster center creation module 246 creates a new cluster center for the image p2. In effect, a circle 468 having radius 466 is drawn around the small hash value 436. The radius 466 corresponds to the threshold distance. If the cluster center 422 falls inside the circle 468, then the image p2 is deemed to be similar to the image p1 and is associated with the cluster center 422. Conversely, if the cluster center 422 falls outside the circle 468, then the image p2 is deemed to be different from the image p1, and a new cluster center is created for the image p2.

In an embodiment of the invention, the threshold distance (i.e., the radius 466) may be any suitable value. The value of the threshold distance may be selected based on the desired degree of possible actual similarity between images before the images are deemed to be similar. For example, in contexts where images should be deemed to be similar only when there is a relatively high degree of possible actual similarity, the threshold distance may be set to a relatively small value. As another example, in contexts where images may be deemed to be similar when there is only a modest degree of possible actual similarity, the threshold distance may be set to a relatively large value. As yet another example, in contexts where an image may be particularly objectionable, the threshold distance may be set to a relatively large value to identify more images that may be similar to the objectionable image. Thus, the threshold distance may be configurable and may be programmed by an administrator of the social networking system 130 to have any value appropriate for a given context of the social networking system 130, such as a particular application, module, campaign, group, user, image, etc.

Figure 4D:
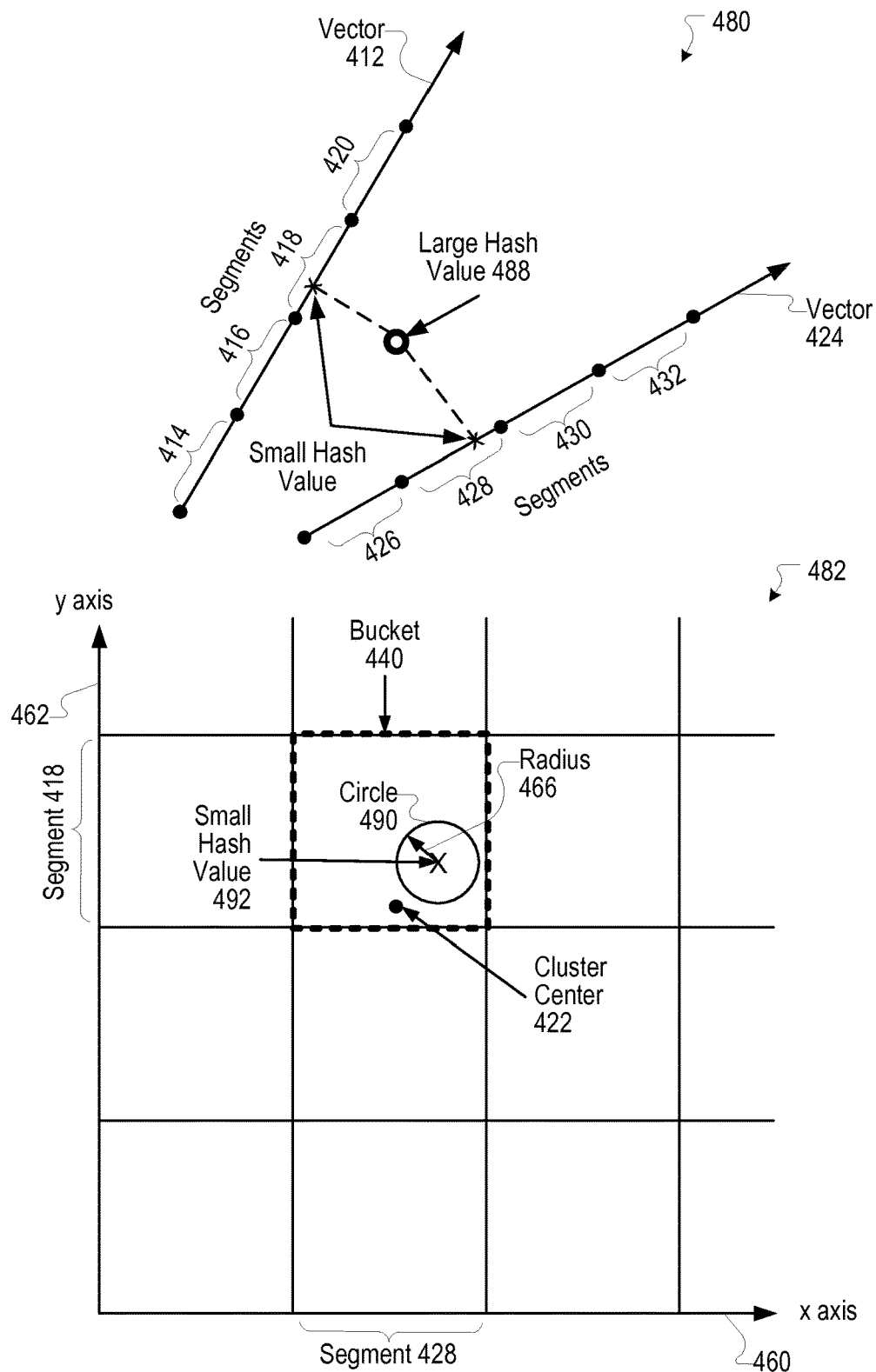

FIG. 4D is a graphical representation of a projection 480 for locality-sensitive hashing and a related mapping 482 in the 2-D coordinate system, which illustrate more than one cluster center being associated with a bucket in accordance with an embodiment of the invention. The large hashing module 240 generates a large hash value 488 associated with a new image p3. The small hashing module 242 projects the large hash value 488 onto the vector 412 and the vector 424. The small hashing module 242 projects the large hash value 488 to fall within the segment 418 of the vector 412 and within the segment 428 of the vector 424. The mapping 482 in the 2-D coordinate system shows a graphical representation of the projection 480. The small hashing module 242 determines that a small hash value 492 associated with the image p3 falls within the bucket 440.

Figure 4E:
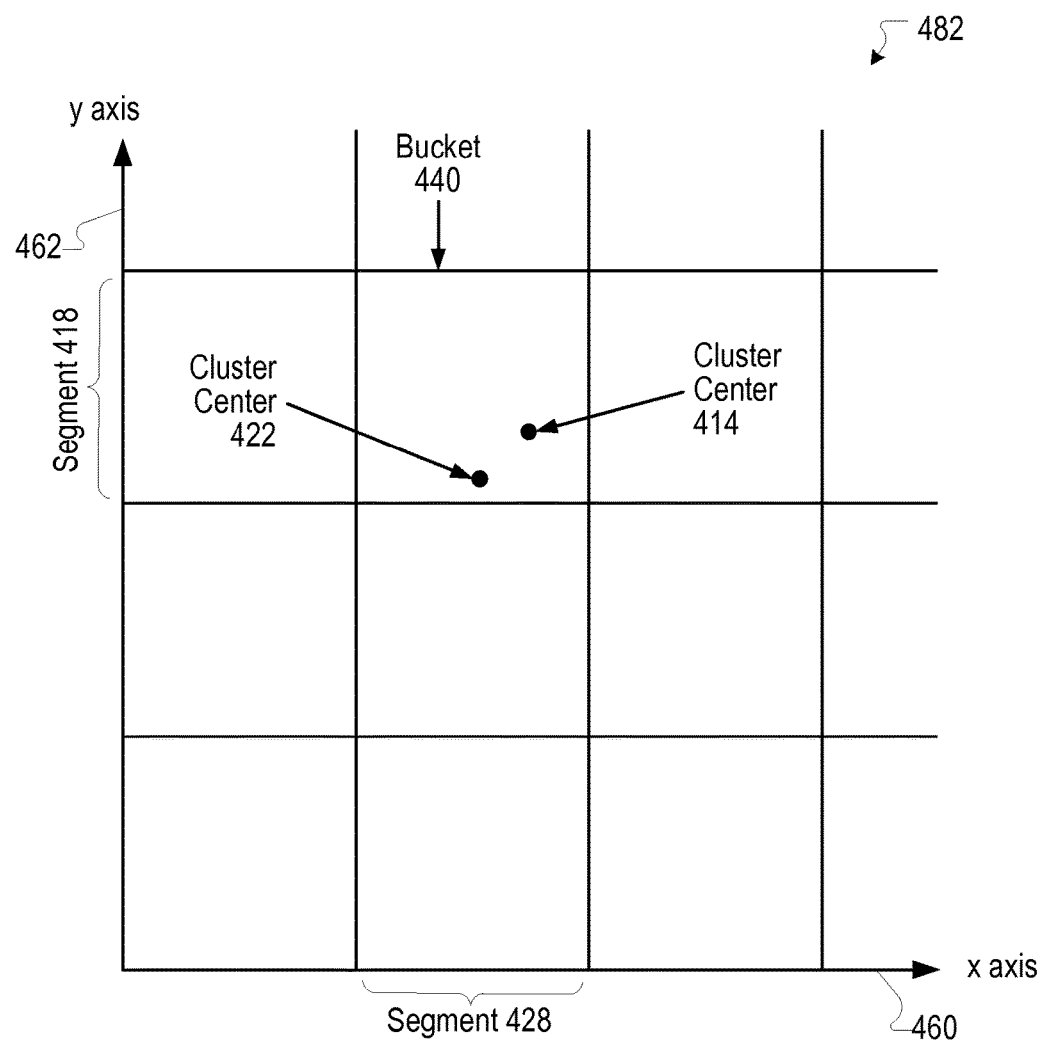

To search for images similar to image p3, the space searching module 244 first determines whether any cluster centers are associated with the bucket 440. Because the cluster center 422 is associated with the bucket 440, the proximity determination module 248 determines whether the cluster center 422 is sufficiently close in distance to the small hash value 492. The proximity determination module 248 computes the distance between the small hash value 492 and the cluster center 422. The proximity determination module 248 then determines whether the computed distance is less than a threshold distance. If the computed distance exceeds the threshold distance (as shown in FIG. 4D), then the image p3 is deemed to be different from the image p1, and the cluster center creation module 246 creates a new cluster center 414 for the image p3, as shown in FIG. 4E. Conversely, if the computed distance is less than the threshold distance, then the image p3 is deemed to be similar to the image p1, and the image p3 is associated with the cluster center 422 (not shown in FIG. 4D or 4E) and a new cluster center is not created. In effect, a circle 490 having the radius 466 is drawn around the small hash value 492. If the cluster center 422 falls inside the circle 490, then the image p3 may be deemed to be similar to the image p1 and the image p2, and the image p3 is associated with the cluster center 422. Conversely, if the cluster center 422 falls outside the circle 490, then the image p3 may be deemed to be different from the image p1 and the image p2, and a new cluster center is created for the image p3.

Figure 5:
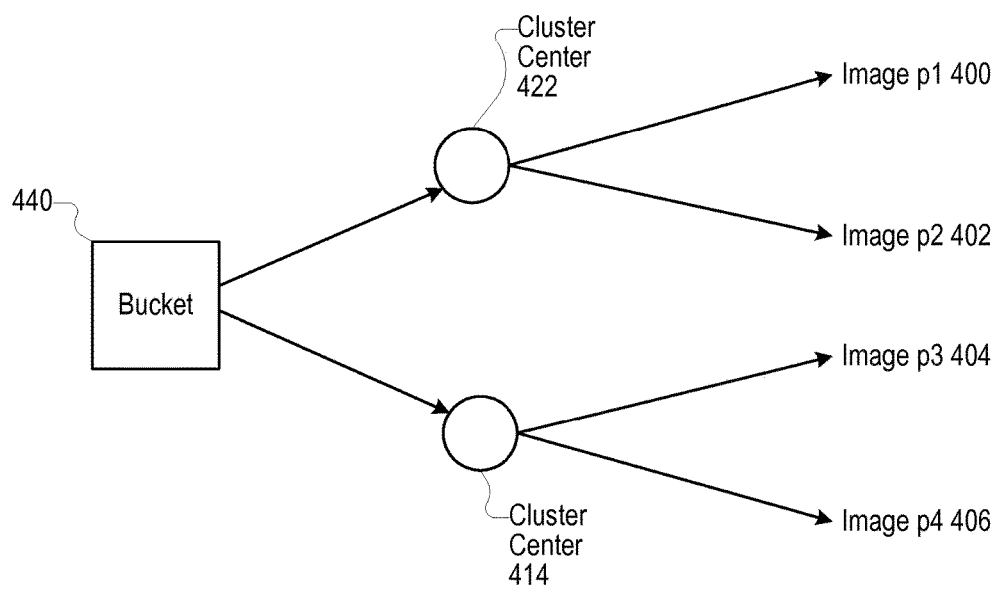
FIG. 5 is a diagram representing associations for a bucket, cluster centers, and images as described in connection with FIGS. 4A-4E in accordance with an embodiment of the invention.

Small hash values associated with additional images may be considered in a manner similar to that described above. For example, a small hash value associated with yet another image p4 may fall into a bucket. The bucket constitutes the search space to search for similar images. All cluster centers associated with the bucket are identified. The distance between the small hash value and each identified cluster center is computed and compared against the threshold distance. If the computed distance for any identified cluster center is less than the threshold distance, then the image p4 is associated with the identified cluster center with the smallest distance to the small hash value for image p4 (e.g., the identified cluster center 414 as shown in FIG. 5). Conversely, if the computed distances for all identified cluster centers are greater than the threshold distance, then a new cluster center is created for the image p4. In effect, a circle of the predetermined radius may be drawn around the small hash value. If a cluster center is found within the circle, then the image p4 is associated with the cluster center and deemed similar to the images already associated with the cluster center. Conversely, if no cluster center is found within the circle, then a new cluster center is created based on the small hash value, and the image p4 is deemed different from other images associated with other cluster centers. The consideration of yet further images in addition to the images p1, p2, p3, p4 may proceed in a similar fashion. In general, any number of cluster centers may be associated with a given bucket.

FIG. 5 is a diagram representing associations among a bucket, cluster centers, and images as described in connection with FIGS. 4A-4E in accordance with an embodiment of the invention. The bucket 440 is associated with the cluster centers 422, 414. Each of the cluster centers 422, 414 is associated with one or more images deemed to be similar. Images p1 400, p2 402, p3 404, p4 406 are grouped according to the cluster centers 422, 414. In particular, the image p1 400 and the image p2 402 are deemed to be similar and are associated with the cluster center 422. The image p3 404 and the image p4 406 are deemed to be similar and are associated with the cluster center 414. The bucket 440, the cluster centers 422, 414, and the images p1 400, p2 402, p3 404, p4 406, as well as their associations, form part of the social graph of the social networking system 130.

Figure 6:
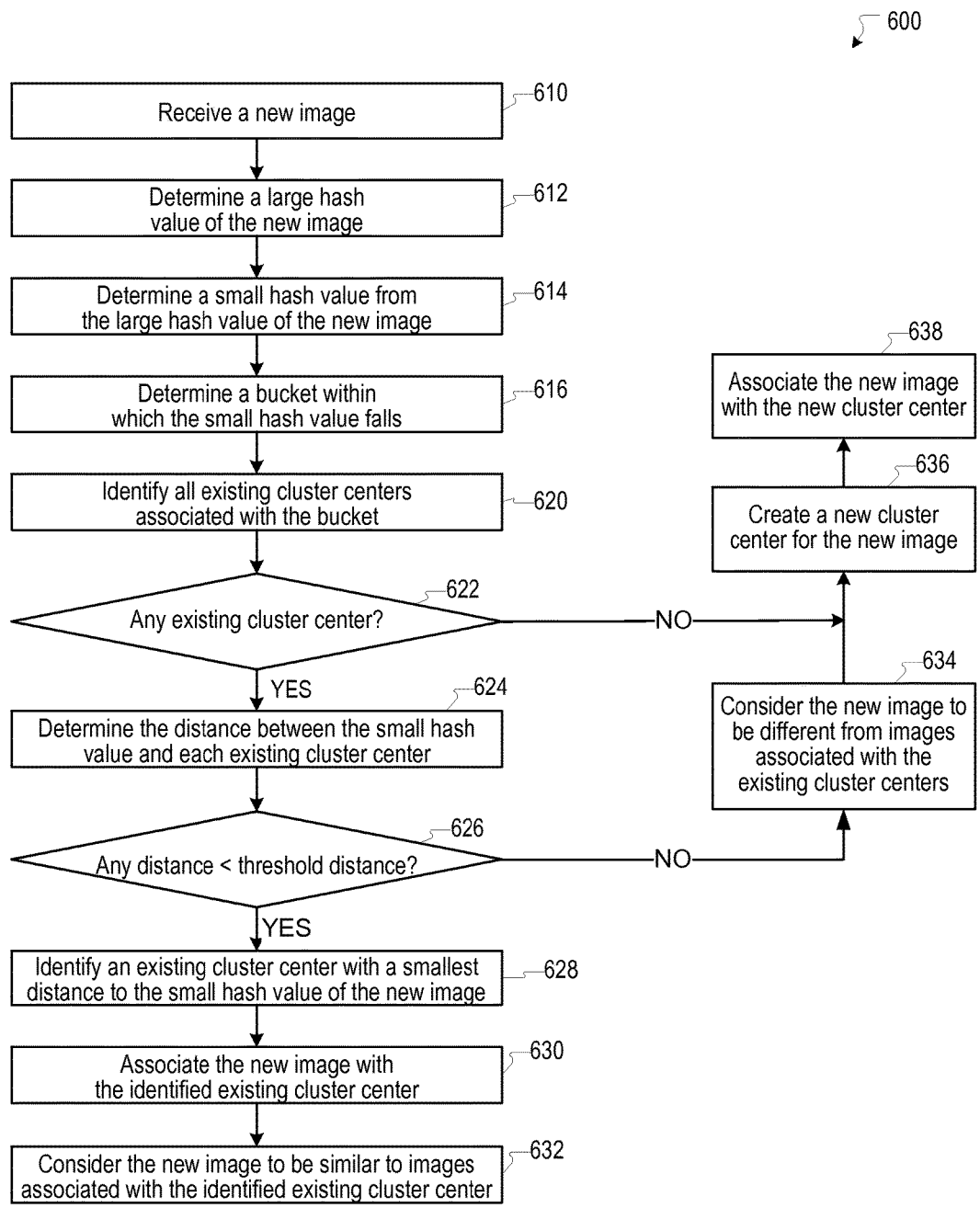
FIG. 6 is a process for determining image similarity to reduce false positives in accordance with an embodiment of the invention.

FIG. 6 shows a process 600 for determining image similarity to reduce false positives in accordance with an embodiment of the invention. Initially, in block 610, a new image is received. In block 612, a large hash value is determined for the new image. The large hash value may be determined using, for example, a content-aware large hashing function. In block 614, a small hash value is then determined for the new image based on the large hash value. The small hash value may be determined using, for example, a locality-sensitive hashing function. The hashing function for the small hash value effectively projects the large hash value onto d vectors in a d-D coordinate system, e.g., as illustrated in FIGS. 4A-4E above for the case of a 2-D coordinate system. The small hash value comprises d values for the d vectors that define the d-D coordinate system. In block 616, a bucket (in the d-D coordinate system) within which the small hash value falls is determined. The bucket can be determined by (i) quantizing the d values of the small hash value and (ii) identifying the bucket in the d-D coordinate system defined by the d quantized values.

In block 620, all existing cluster centers that are associated with the bucket are identified. Existing cluster centers are those that have already been created for existing images. The search space for the new image is substantially reduced by considering only cluster centers that are associated with the bucket instead of all cluster centers associated with other buckets. In block 622, a determination is then made whether there is any existing cluster center associated with the bucket. If the answer is "No" for block 622, then the small hash value of the new image is the first small hash value to be projected onto the bucket. In block 636, a new cluster center is then created for the new image and is given the coordinates of the small hash value. In block 638, the new image is then associated with the new cluster center.

Conversely, if there is at least one existing cluster center associated with the bucket and the answer is "Yes" for block 622, then, in block 624, the distance between the small hash value and each existing cluster center associated with the bucket is determined. In block 626, a determination is then made whether the distance from the small hash value to any existing cluster center is less than a threshold distance. If the answer is "No" for block 626, then, in block 634, the new image is considered to be different from the images associated with the existing cluster centers that are associated with the bucket. In block 636, a new cluster center is then created for the new image, and, in block 638, the new image is associated with the new cluster center. Hence, more than one cluster center may be created and associated with the bucket if the images are not deemed to be similar.

However, if the distance from the small hash value to at least one existing cluster center is less than the threshold distance and the answer is "Yes" for block 626, then, in block 628, an existing cluster center with the smallest distance to the small hash value of the new image is identified. Another existing cluster center with a distance of less than the threshold distance to the small hash value may also be selected. In any case, in block 630, the new image may be associated with the identified existing cluster center. In block 632, the new image is considered to be similar to the images associated with the identified existing cluster center.

In an embodiment of the invention, the process 600 may be entirely or partially performed by the image similarity analysis module 132. In an embodiment of the invention, the process 600 may be performed at least in part by the social networking system 130.

Determination of False Negatives

FIGS. 7A-7G graphically illustrate consideration of multiple buckets in determining image similarity in accordance with an embodiment of the invention. Two small hash values of two similar images may be relatively close to each other in a d-D coordinate system but may be projected onto different buckets due to quantization. For example, small hash values corresponding to large hash values 330 and 332 in FIG. 3B are relatively close to each other but are projected onto two different buckets due to quantization. Searching for similar images in multiple buckets can account for the effect of quantization. The ability to consider multiple buckets avoids error in assumptions that small hash values that happen to fall into different buckets correspond to different images. In this way, the problem of false negatives may be addressed.

Figure 7A:
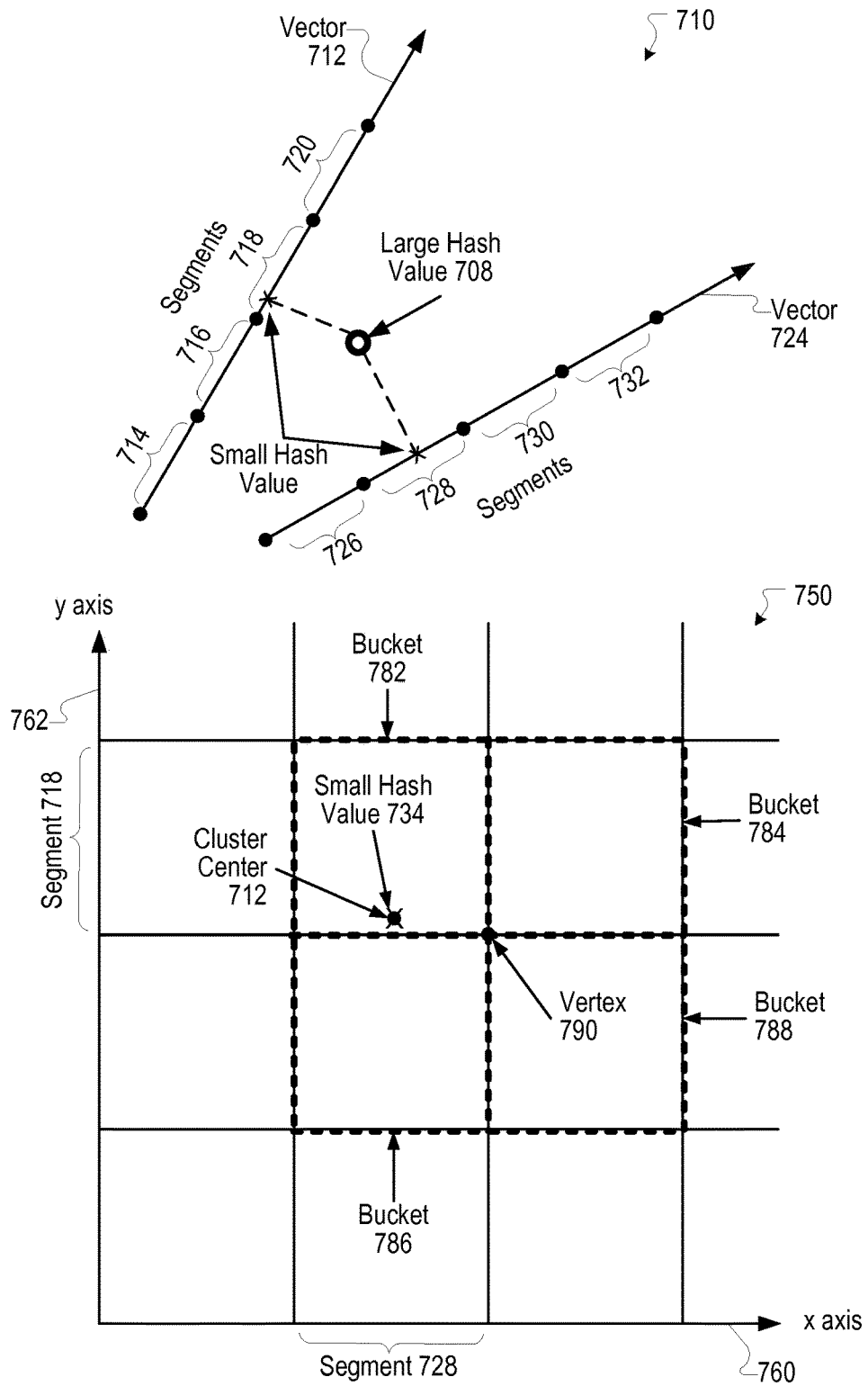
FIGS. 7A-7G are graphical representations of locality-sensitive hashing of images and related mappings to account for false negatives in accordance with an embodiment of the invention.

FIG. 7A is a graphical representation of a projection 710 for locality-sensitive hashing and a related mapping 750 in a 2-D coordinate system, which illustrate creation of a first cluster center associated with a new image in accordance with an embodiment of the invention. The large hashing module 240 in FIG. 2 generates a large hash value 708 associated with a new image p5. The small hashing module 242 in FIG. 2 projects the large hash value 708 onto a vector 712 and a vector 724. The vector 712 is divided into a number of segments, with four segments 714, 716, 718, 720 being shown in FIG. 7A. The vector 724 is divided into a number of segments, with four segments 726, 728, 730, 732 being shown in FIG. 7A. The large hash value 708 is projected to fall within the segment 718 of the vector 712 and within the segment 728 of the vector 724.

The mapping 750 in the 2-D coordinate system shows a graphical representation of the projection 710. The 2-D coordinate system includes an x axis 760 that corresponds to the vector 724, and a y axis 762 that corresponds to the vector 712. The x axis 760 is divided into units corresponding to the segments of vector 724. The y axis 762 is also divided into units corresponding to the segments of vector 712. The segments of the vectors 712, 724 define buckets in the 2-D coordinate system. For example, the segment 718 of the vector 712 and the segment 728 of the vector 724 define a bucket 782 in the 2-D coordinate system. A small hash value 734 associated with the image p5 falls within the bucket 782.

To search for images similar to the image p5, the space searching module 244 may consider adjacent buckets, not merely the bucket 782. In an embodiment of the invention, the space searching module 244 may determine adjacent buckets by first locating a vertex nearest to a small hash value associated with a new image. A vertex is a point in a d-D coordinate system corresponding to the corner of a set of buckets. In an embodiment of the invention, a small hash value of an image may be quantized, and the quantized small hash value may be deemed as a vertex. Buckets that coincide with the vertex (i.e., having a corner at the vertex) may be deemed adjacent buckets. In general, the number of adjacent buckets sharing a vertex is dependent on the number of dimensions (d) in the d-D coordinate system. There are $2^d$ adjacent buckets sharing a vertex in the d-D coordinate system.

In an embodiment of the invention, the number of adjacent buckets is 8 in a 3-D coordinate system, and the number of adjacent buckets is 4 in a 2-D coordinate system. In general, any number of adjacent buckets may be searched for similar images. The number of adjacent buckets to search may be dependent on various factors such as the threshold distance used to identify similar images, the sizes of the segments defining each bucket, the desired probability of false negatives, etc. For purposes of illustration, the projections shown herein are simplified examples of locality-sensitive hashing in two dimensions, i.e., when dimension number d is selected to have a value of 2. Accordingly, based on the simplified examples, the number of adjacent buckets to search, as shown herein, is 4.

As shown in FIG. 7A, a vertex 790 is nearest to the small hash value 734. From the perspective of the vertex 790, buckets 782, 784, 786, 788 are then considered to be adjacent buckets with respect to the small hash value 734. A determination is made as to whether any cluster centers are associated with the buckets 782, 784, 786, 788. By limiting the search for cluster centers to a limited number of buckets, the space searching module 244 optimizes the search process, allowing the search to be conducted more rapidly and efficiently. Because no cluster centers are associated with the buckets 782, 784, 786, 788, the cluster center creation module 246 creates a first, new cluster center 712 based on the small hash value 734. The image p5 is associated with the cluster center 712. In an embodiment of the invention, the first cluster center 712 is associated with the four adjacent buckets 782, 784, 786, 788.

Figure 7B:
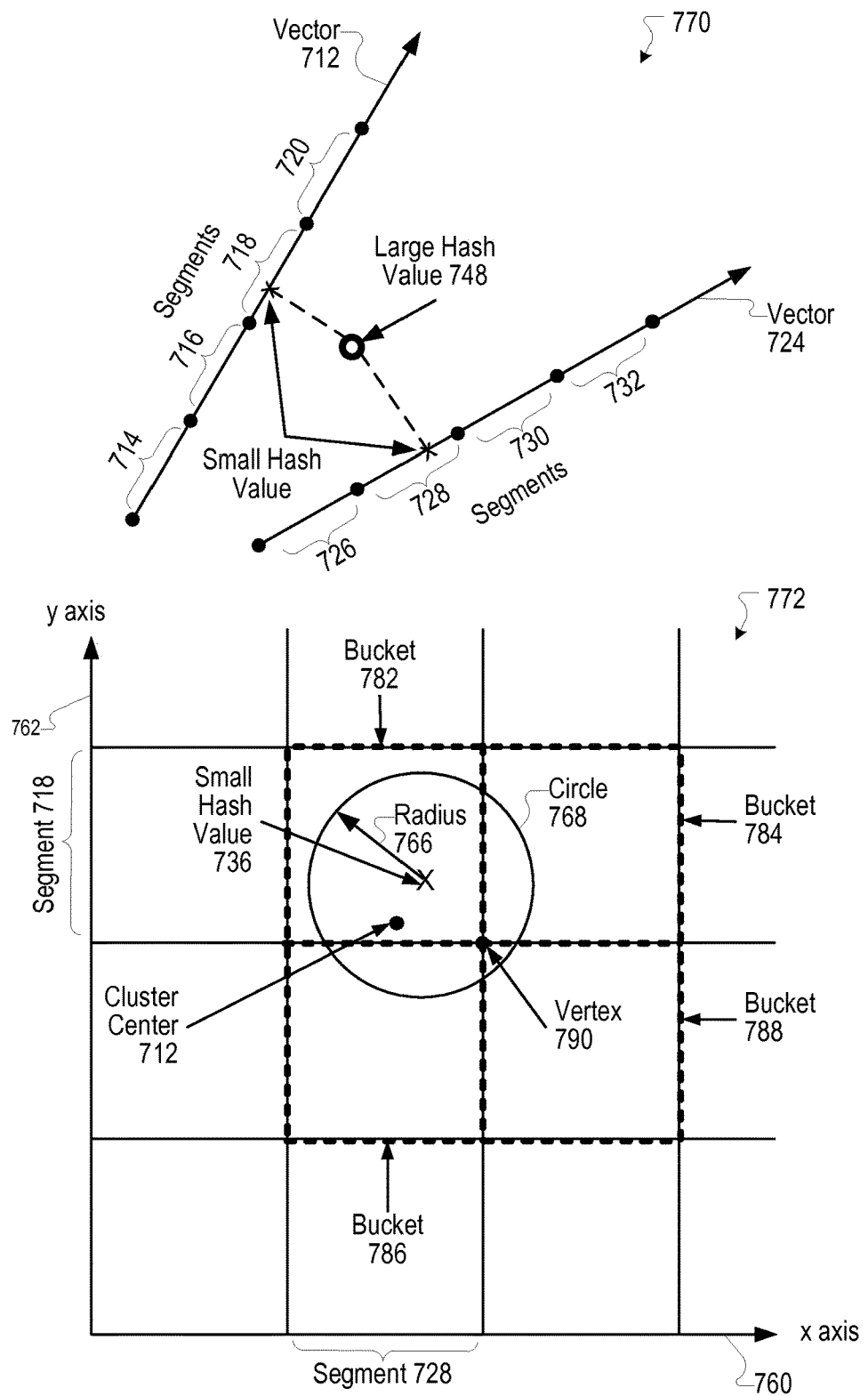

FIG. 7B is a graphical representation of a projection 770 for locality-sensitive hashing and a related mapping 772 in the 2-D coordinate system, which illustrate association of a new image with a preexisting cluster center in accordance with an embodiment of the invention. The large hashing module 240 generates a large hash value 748 associated with a new image p6. The small hashing module 242 projects the large hash value 748 onto the vector 712 and the vector 724. The large hash value 748 is projected to fall within the segment 718 of the vector 712 and within the segment 728 of the vector 724.

Figure 7C:
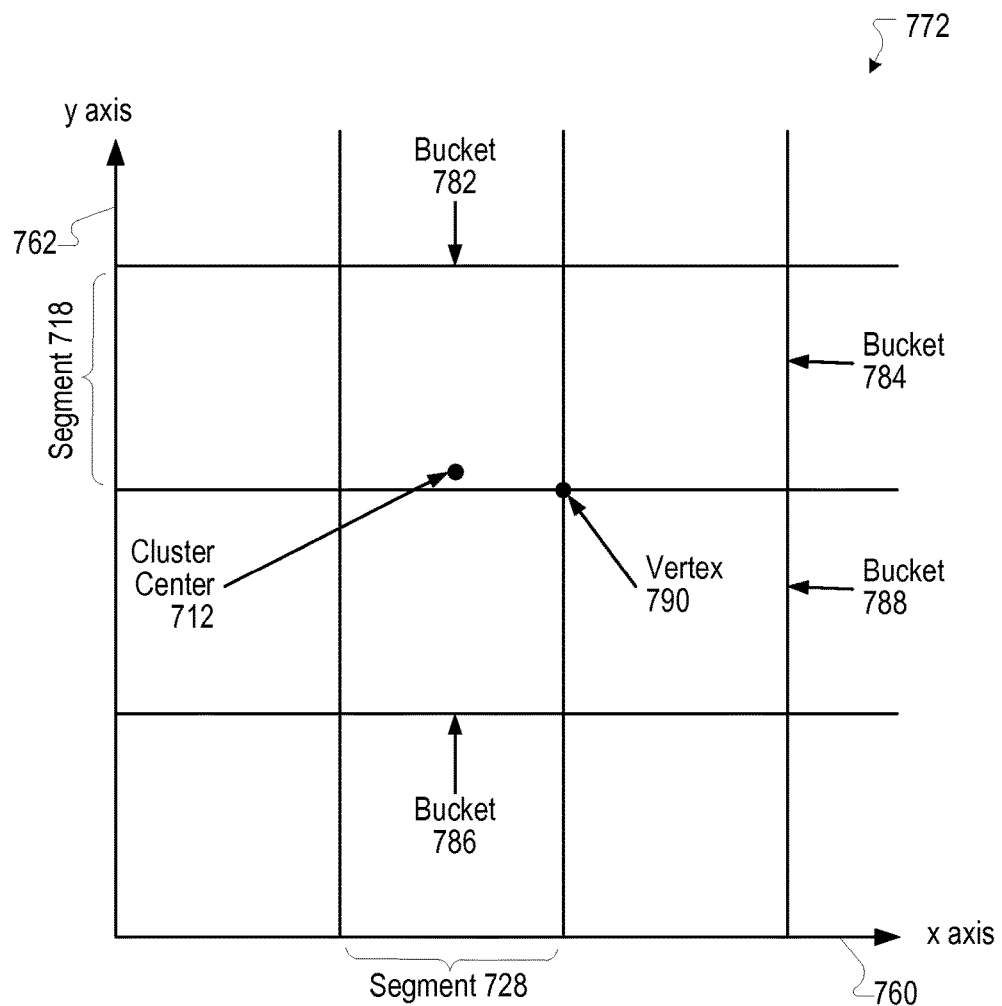

The mapping 772 in the 2-D coordinate system shows a graphical representation of the projection 770. The small hashing module 242 generates a small hash value 736 based on the large hash value 748 associated with the image p6. The small hashing module 242 determines that the small hash value 736 falls within the bucket 782. To search for images similar to the image p6, the space searching module 244 considers adjacent buckets, not merely the bucket 782. As shown in FIG. 7B, the vertex 790 is nearest to the small hash value 736. From the perspective of the vertex 790, the buckets 782, 784, 786, 788 are then considered to be adjacent buckets with respect to the small hash value 736, like the small hash value 734. The space searching module 244 determines whether any cluster centers are associated with either any or all of the adjacent buckets 782, 784, 786, 788. In an embodiment of the invention, each cluster center associated with all four of the adjacent buckets 782, 784, 786, 788 for the small hash value 736 is considered. In another embodiment, each cluster center associated with any one of the four adjacent buckets 782, 784, 786, 788 for the small hash value 736 is considered. Because the cluster center 712 is associated with the buckets 782, 784, 786, 788, the proximity determination module 248 further determines whether the cluster center 712 is sufficiently close in Euclidean distance to the small hash value 736. The distance between the small hash value 736 and the cluster center 712 is computed and compared against a threshold distance by the proximity determination module 248. If the computed distance is less than the threshold distance (which is the case in FIG. 7B), then the image p6 is deemed to be similar to the image p5, and the image p6 is associated with the cluster center 712. A new cluster center is not created for the image p6, as shown in FIG. 7C. Conversely, if the computed distance exceeds the threshold distance (not shown in FIG. 7B), then the image p6 is deemed to be different from the image p5, and the cluster center creation module 246 creates a new cluster center for the image p6. In effect, a circle 768 having radius 766 may be drawn around the small hash value 736. When the cluster center 712 falls inside the circle 768, the image p6 may be deemed to be similar to the image p5, and the image p6 is associated with the cluster center 712. When the cluster center 712 falls outside the circle 768, the image p6 may be deemed to be different from the image p5, and the cluster center creation module 246 may create a new cluster center associated with the buckets 782, 784, 786, 788.

The threshold distance may be any suitable value, which may be selected based on the considerations described above in connection with FIGS. 4B-4E. The threshold distance in FIGS. 7B-7F is larger than the threshold distance in FIGS. 4B-4E. In an embodiment of the invention, the threshold distance to determine false positives may be different from the threshold distance to determine false negatives.

Figure 7D:
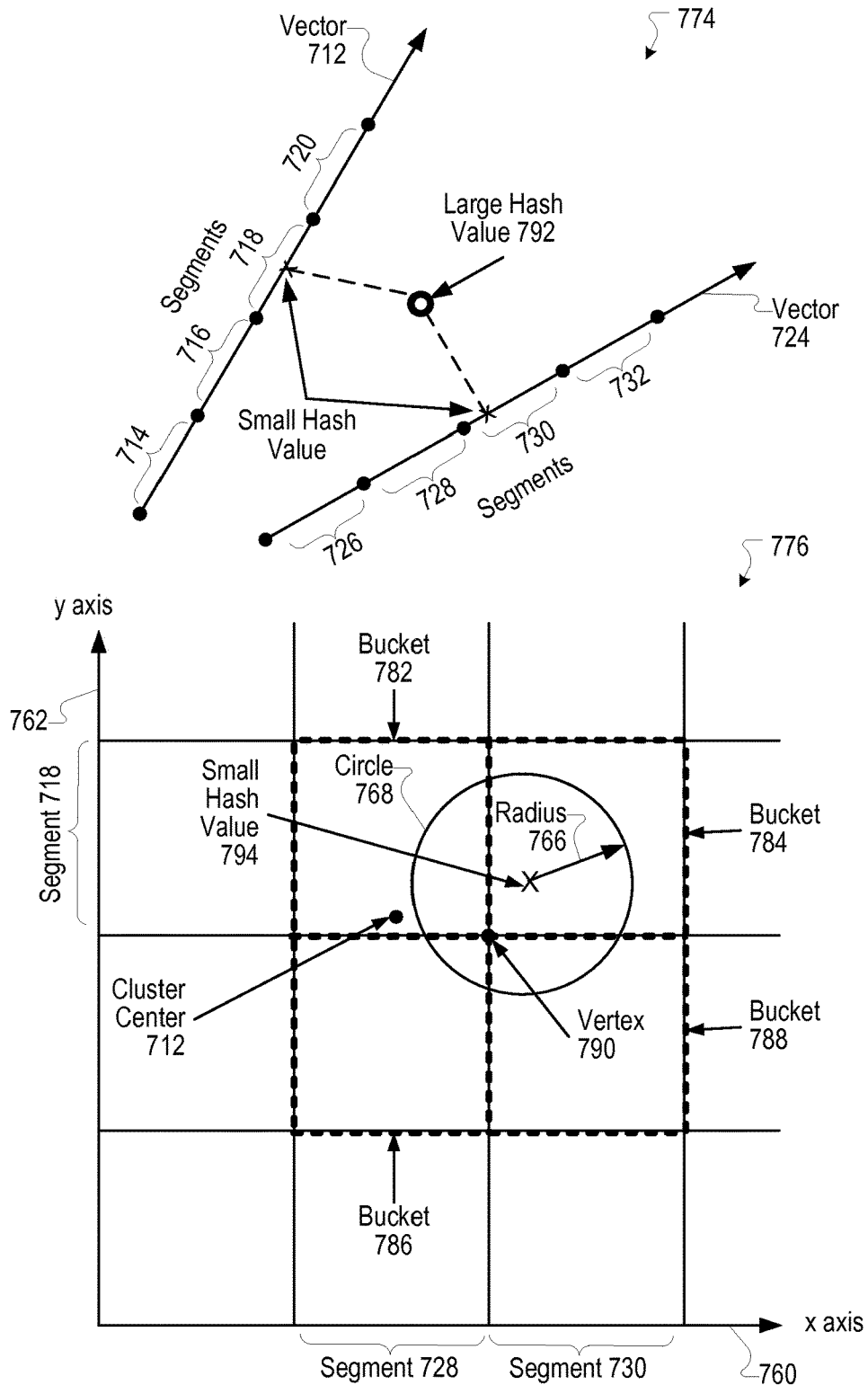

FIG. 7D is a graphical representation of a projection 774 for locality-sensitive hashing and a related mapping 776 in the 2-D coordinate system, which illustrate association of a new image with a new cluster center in accordance with an embodiment of the invention. The large hashing module 240 generates a large hash value 792 associated with a new image p7. The small hashing module 242 projects the large hash value 792 onto the vector 712 and the vector 724. The large hash value 792 is projected to fall within the segment 718 of the vector 712 and within the segment 730 of the vector 724.

Figure 7E:
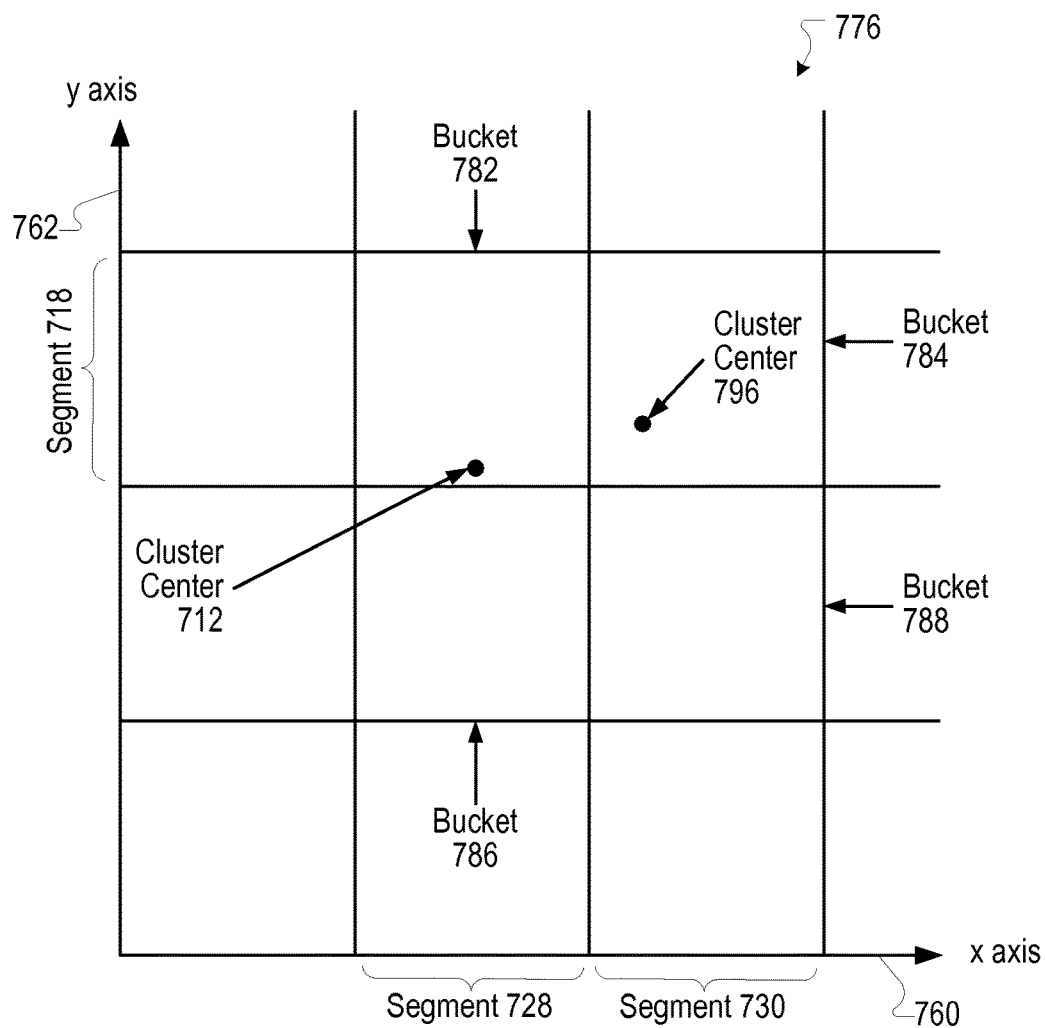

The mapping 776 in the 2-D coordinate system shows a graphical representation of the projection 774. The small hashing module 242 generates a small hash value 794 based on the large hash value 792 associated with the image p7. The small hash value 794 falls within the bucket 784. To search for images similar to the image p7, the space searching module 244 considers adjacent buckets, not merely the bucket 784. As shown in FIG. 7D, the vertex 790 is nearest to the small hash value 794. From the perspective of the vertex 790, the buckets 782, 784, 786, 788 are then considered to be adjacent buckets with respect to the small hash value 794, like the small hash value 734 and the small hash value 736. The space searching module 244 determines whether any cluster centers are associated with, for example, either all or any of the buckets 782, 784, 786, 788. Because the cluster center 712 is associated with the buckets 782, 784, 786, 788, the proximity determination module 248 further determines whether the cluster center 712 is sufficiently close in Euclidean distance to the small hash value 794. The distance between the small hash value 794 and the cluster center 712 is computed and compared against the threshold distance by the proximity determination module 248. If the computed distance exceeds the threshold distance (shown in FIG. 7D), then the image p7 is deemed to be different from the image p5, and the cluster center creation module 246 creates a new cluster center 796 for the image p7, as shown in FIG. 7E. Conversely, if the computed distance is less than the threshold distance (which is not the case in FIG. 7D), then the image p7 is deemed to be similar to the image p5, and the image p7 is associated with the cluster center 712 (not shown in FIG. 7D). In effect, a circle 768 having the radius 766 may be drawn around the small hash value 794. When the cluster center 712 falls inside the circle 768, the image p7 may be deemed to be similar to the image p5, and the image p7 is associated with the cluster center 712. When the cluster center 712 falls outside the circle 768, the image p7 may be deemed to be different from the image p5, and the cluster center creation module 246 creates the new cluster center 796 associated with the buckets 782, 784, 786, 788 (shown in FIG. 7E).

Figure 7F:
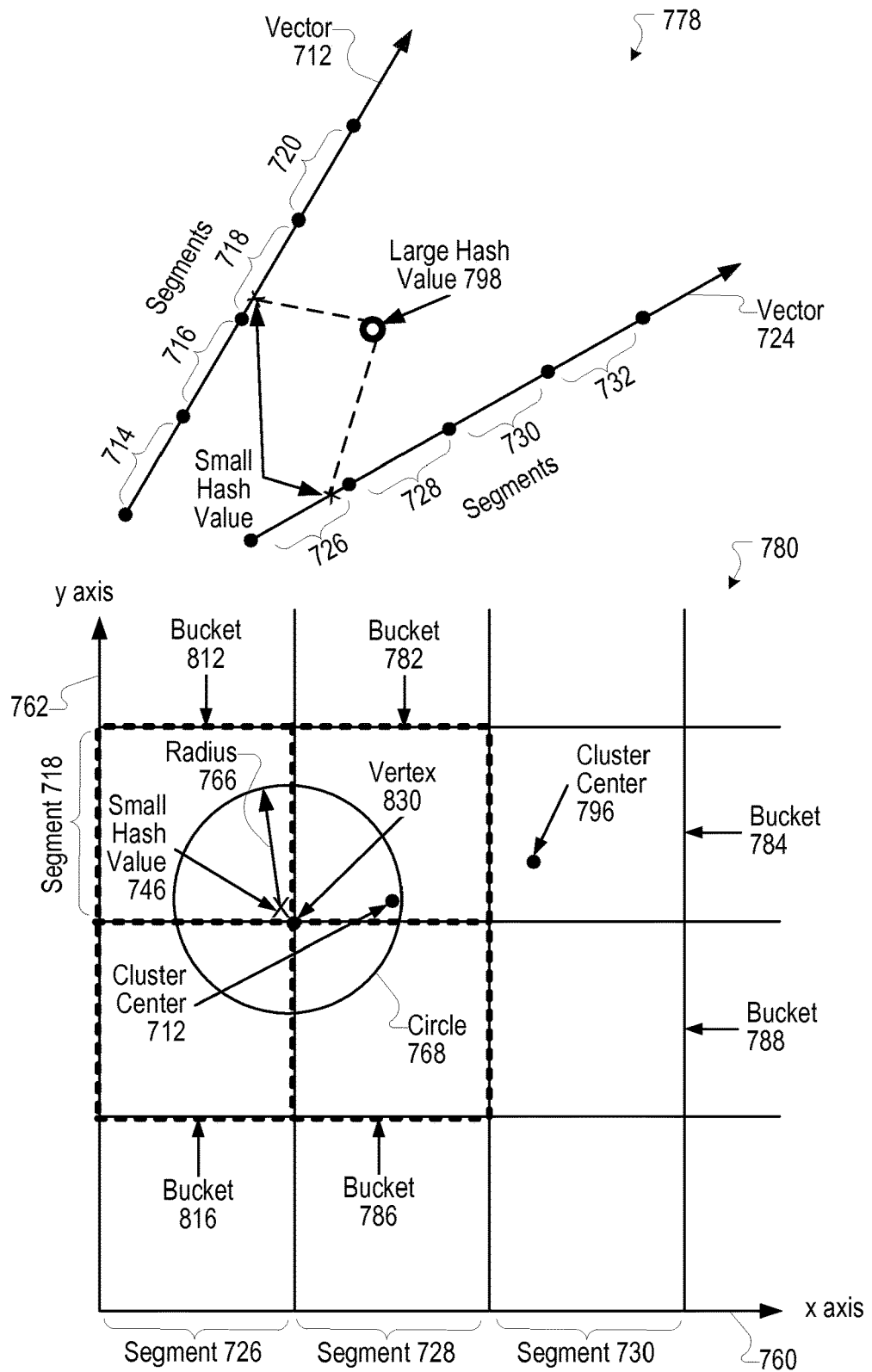

FIG. 7F is a graphical representation of a projection 778 for locality-sensitive hashing and a related mapping 780 in the 2-D coordinate system, which illustrate association of a new image with an existing cluster center when a small hash value associated with the new image and the existing cluster center fall into different, adjacent buckets in accordance with an embodiment of the invention. The large hashing module 240 generates a large hash value 798 associated with a new image p8. The small hashing module 242 projects the large hash value 798 onto the vector 712 and the vector 724. The large hash value 798 is projected to fall within the segment 718 of the vector 712 and within the segment 726 of the vector 724.

The mapping 780 in the 2-D coordinate system shows a graphical representation of the projection 778. The small hashing module 242 generates a small hash value 746 based on the large hash value 798 associated with the image p8. The small hash value 746 falls within a bucket 812. To search for images similar to the image p8, the space searching module 244 considers adjacent buckets, not merely the bucket 812. As shown in FIG. 7F, a vertex 830 is nearest to the small hash value 746. From the perspective of the vertex 830, buckets 812, 782, 816, 786 are then considered to be adjacent buckets with respect to the small hash value 746.

Figure 7G:
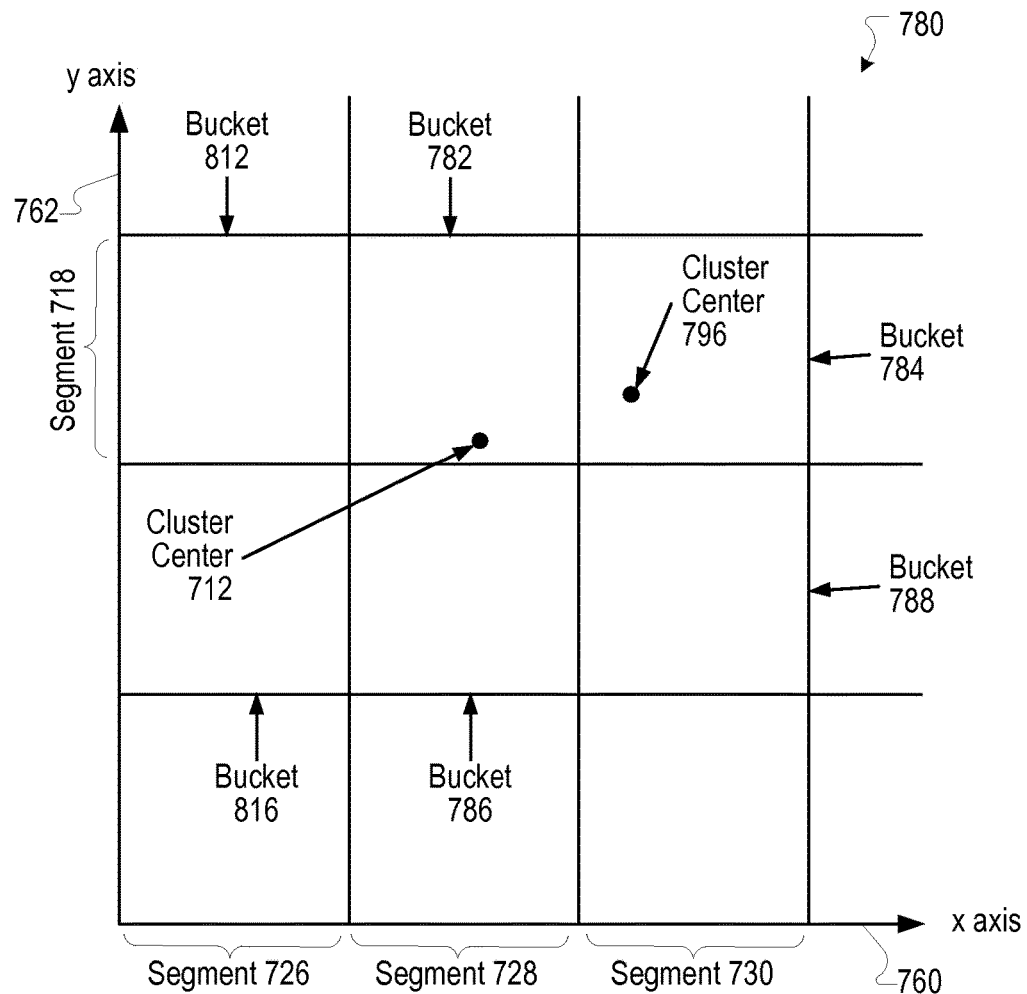

The space searching module 244 determines whether any cluster centers are associated with, for example, either all or any of the buckets 812, 782, 816, 786. Because the cluster center 712 and the cluster center 796 are associated with the buckets 812, 782, 816, 786, the proximity determination module 248 further determines whether any of the cluster center 712 and the cluster center 796 is sufficiently close in Euclidean distance to the small hash value 746. The distance between the small hash value 746 and each of the cluster centers 712 and 796 is computed and compared against the threshold distance by the proximity determination module 248. If either computed distance is less than the threshold distance (which is the case in FIG. 7F), then the small hash value 746 is associated with the closest cluster center 712, and the image p8 is deemed to be similar to the image p5 associated with the cluster center 712, as shown in FIG. 7G. Conversely, if the computed distances for all cluster centers exceed the threshold distance (not shown in FIG. 7F), then the image p8 is deemed to be different from the images of these cluster centers, and the cluster center creation module 246 creates a new cluster center for the image p8. In effect, a circle 768 having the radius 766 may be drawn around the small hash value 746. If the cluster center 712 or the cluster center 796 falls inside the circle 768, the image p8 may be deemed to be similar to the image p5 or the image p7, respectively, and the image p8 is associated with the closer of the cluster center 712 or the cluster center 796, respectively. If the cluster center 712 and the cluster center 796 fall outside the circle 768, the image p8 may be deemed different from the image p5 and the image p7, respectively, and the cluster center creation module 246 creates a new cluster center for the new image p8 associated with the buckets 812, 782, 816, 786.

In another embodiment of the invention, a cluster center may be associated with a single bucket, instead of a group of adjacent buckets. To search for images similar to a new image, a vertex that is closest to a small hash value for the new image may be determined by the space searching module 244. All adjacent buckets sharing this vertex may be identified, and all cluster centers associated with these adjacent buckets may be identified. A determination may then be made by the proximity determination module 248 whether the small hash value for the new image is sufficiently close to (e.g., within the threshold distance of) any of the identified cluster centers.

Small hash values associated with additional images may be considered in a manner similar to that described above. For example, a small hash value associated with yet another image p9 may fall into a bucket. The vertex nearest to the small hash value may be identified, and adjacent buckets may be identified. The adjacent buckets constitute the search space for similar images. All cluster centers associated with the adjacent buckets may be identified. The distance between the small hash value and each identified cluster center may be computed and compared against the threshold distance. If the computed distance for any identified cluster center is less than the threshold distance, then the image p9 may be associated with the identified cluster center (e.g., the identified cluster center with the smallest distance to the small hash value for the image p9). Conversely, if the computed distances for all identified cluster centers are greater than the threshold distance, then a new cluster center may be created for the image p9. In effect, a circle of a suitable radius may be drawn around the small hash value. If a cluster center is found within the circle, even if the cluster center is found in a different bucket, the image p9 is associated with the cluster center and deemed similar to the images already associated with the cluster center. If no cluster center is found within the circle, a new cluster center is created based on the small hash value, and the image p9 is deemed different from other images associated with other cluster centers. The consideration of yet further images in addition to the images p5, p6, p7, p8, p9 may proceed in a similar fashion.

In the embodiments described above, adjacent buckets are defined to include only buckets sharing a common vertex. In this embodiment, only one "layer" of buckets surrounding the vertex is considered. Adjacent buckets may also be defined in other manners. For example, adjacent buckets may be defined to include two layers of buckets surrounding a vertex that is closest to a small hash value. In this embodiment, the adjacent buckets may include "inner" buckets sharing the same vertex as the small hash value as well as "outer" buckets sharing a vertex with any of the inner buckets. In general, the probability of false negatives may be reduced by considering more adjacent buckets at the expense of increasing the search space and related computations.

Figure 8:
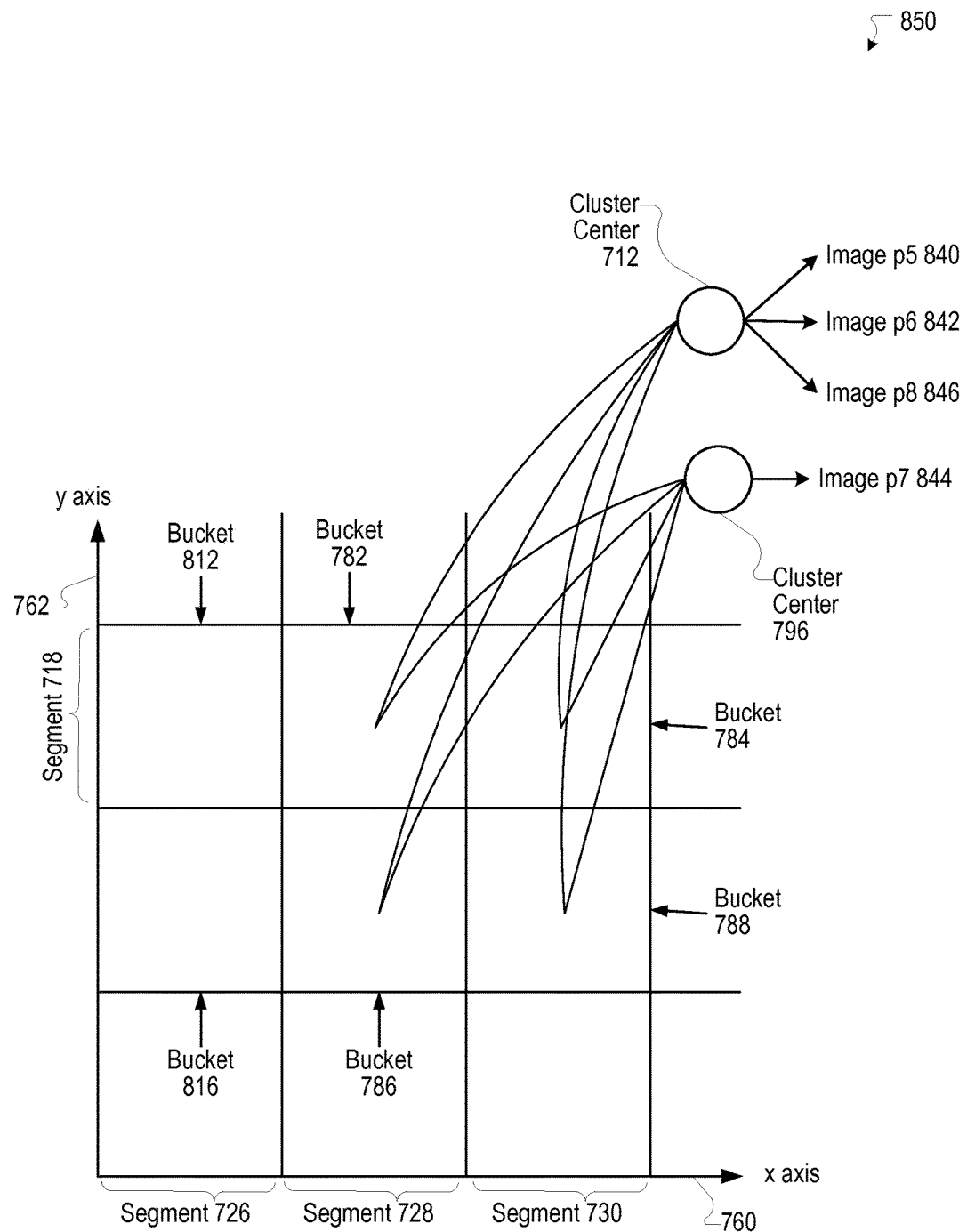
FIG. 8 is a diagram representing associations for buckets, cluster centers, and images as described in connection with FIGS. 7A-7G in accordance with an embodiment of the invention.

FIG. 8 is a diagram representing associations among buckets, cluster centers, and images as described in connection with FIGS. 7A-7G in accordance with an embodiment of the invention. A graph 850 includes the buckets 782, 784, 786, 788, 812, 816. The cluster center 712 is associated with adjacent buckets 782, 784, 786, 788. The cluster center c7 796 is associated with adjacent buckets 782, 784, 786, 788. Each of the cluster centers 712, 796 is associated with one or more images deemed to be similar. The images p5 840, p6 842, p8 846 are deemed to be similar and are associated with the cluster center 712. The image p7 844 is associated with the cluster center 796. The buckets 782, 784, 786, 788, 812, 816, the cluster centers c5 712, c7 796, and the images p5 840, p6 842, p7 844, p8 846, as well as their associations, form part of the social graph of the social networking system 130.

Figure 9:
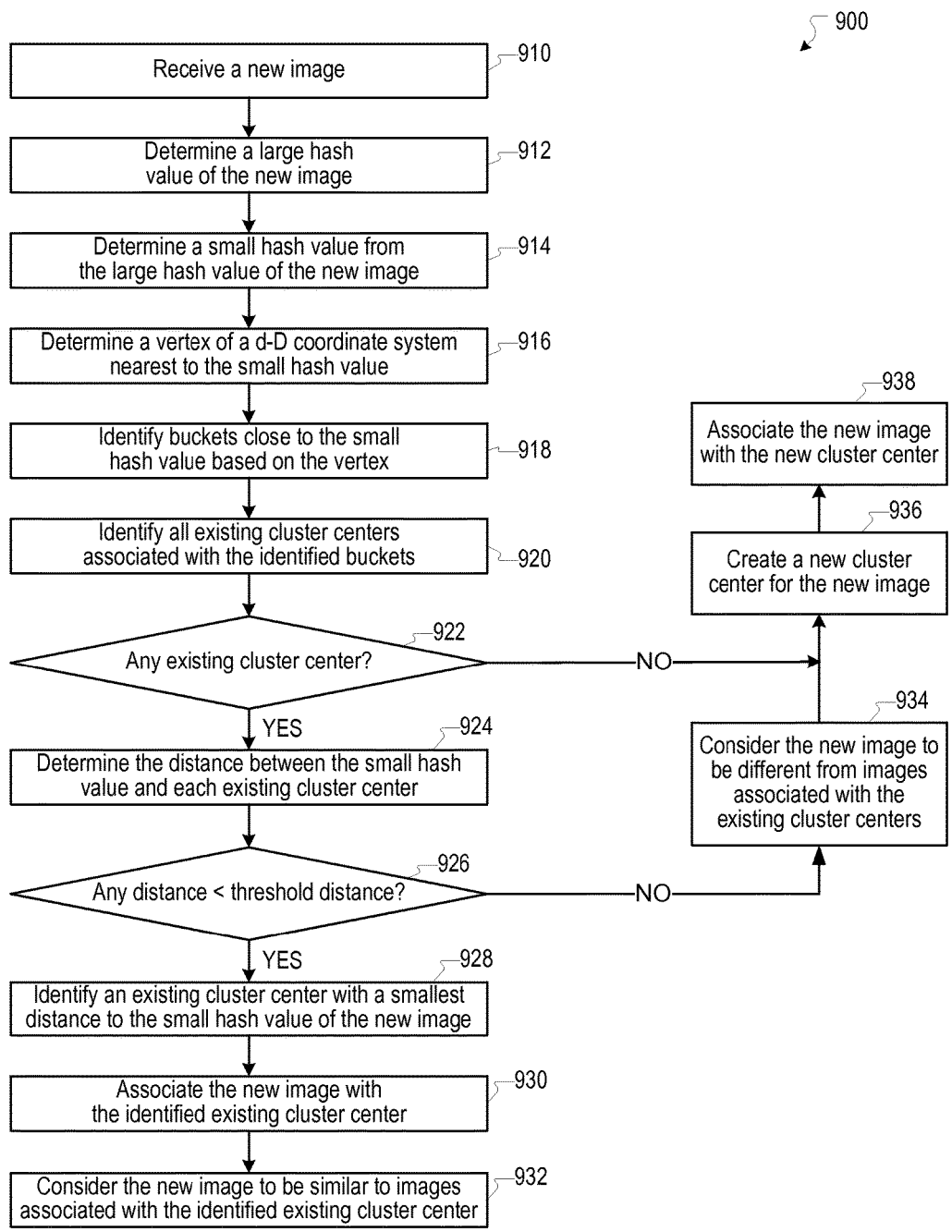
FIG. 9 is a process for determining image similarity to reduce false negatives in accordance with an embodiment of the invention.

FIG. 9 shows a process 900 for determining image similarity to reduce false negatives in accordance with an embodiment of the invention. Initially, in block 910, a new image is received. In block 912, a large hash value of the new image is determined. The large hash value may be determined using, for example, a content-aware large hashing function. In block 914, a small hash value is then determined from the large hash value of the new image. The small hash value may be determined by using, for example, a locality-sensitive hashing function. In block 916, a vertex of a d-D coordinate system that is nearest to the small hash is determined. The nearest vertex may be determined by (i) quantizing the d values of the small hash value and (ii) identifying the vertex in the d-D coordinate system defined by the d quantized values.

In block 918, buckets that are close to the small hash value may be identified based on the vertex. The identified buckets may be those that are adjacent to the small hash value and having the vertex determined in block 916 as one of their vertices. The buckets that are close to the small hash value may also be identified in other manners. In any case, in block 920, all existing cluster centers that are associated with the identified buckets are identified. The search space for the new image is substantially reduced by considering only cluster centers that are associated with the buckets that are close to the small hash value instead of all cluster centers associated with all buckets. In block 922, a determination is then made whether there is any existing cluster center associated with any of the identified buckets. If the answer is "No" for block 922, then the small hash value of the new image is the first small hash value to be projected onto one of the identified buckets. In block 936, a new cluster center is then created for the new image and is given the coordinates of the small hash value. In block 938, the new image is then associated with the new cluster center.

Conversely, if there is at least one existing cluster center associated with the identified buckets and the answer is "Yes" for block 922, then, in block 924, the distance between the small hash value and each existing cluster center associated with any identified bucket is determined. In block 926, a determination is then made whether the distance from the small hash value to any existing cluster center is less than a threshold distance. If the answer is "No" for block 926, then, in block 934, the new image is considered to be different from the images associated with the existing cluster centers. In block 936, a new cluster center is then created for the new image, and, in block 938, the new image is associated with the new cluster center.

However, if the distance from the small hash value to at least one existing cluster center is less than the threshold distance and the answer is "Yes" for block 926, then, in block 928, an existing cluster center with the smallest distance to the small hash value of the new image is identified. Another existing cluster center with a distance of less than the threshold distance to the small hash value may also be selected. In any case, in block 930, the new image may be associated with the identified existing cluster center. In block 932, the new image is considered to be similar to the images associated with the identified existing cluster center.

In an embodiment of the invention, the process 900 may be entirely or partially performed by the image similarity analysis module 132. In an embodiment of the invention, the process 900 may be performed at least in part by the social networking system 130.

In various embodiments, the preceding figures and their related discussion herein have described the use of a small hash value of a large hash value of an image to identify relevant buckets, as well as to create a cluster center or to compare with an existing cluster center associated with the identified buckets. In another embodiment, once the relevant buckets are identified with the small hash value, the large hash value, instead of the small hash value, may be used to create a cluster center or to compare with an existing cluster center associated with the identified buckets. For example, with respect to determination of false positives, a large hash value may be determined for a new image. The large hash value may be determined using, for example, a content-aware large hashing function. A small hash value then may be determined for the new image based on the large hash value. The small hash value may be determined using, for example, a locality-sensitive hashing function. The hashing function for the small hash value effectively may project the large hash value onto d vectors in a d-D coordinate system. The small hash value may comprise d values for the d vectors that define the d-D coordinate system. A bucket (in the d-D coordinate system) within which the small hash value falls is determined.

All existing cluster centers that are associated with the bucket may be identified. Existing cluster centers are those that have already been created for existing images. The search space for the new image is substantially reduced by considering only cluster centers that are associated with the bucket instead of all cluster centers associated with other buckets. A determination may be made as to whether there is any existing cluster center associated with the bucket. If not, then the large hash value of the new image is the first large hash value to be projected onto the bucket. A new cluster center then may be created for the new image and is given the coordinates of the large hash value. The new image then may be associated with the new cluster center.

Conversely, if there is at least one existing cluster center associated with the bucket, then the distance between the large hash value and each existing cluster center associated with the bucket is determined. A determination is then made whether the distance from the large hash value to any existing cluster center is less than a threshold distance. If not, then the new image may be considered to be different from the images associated with the existing cluster centers that are associated with the bucket. A new cluster center then may be created for the new image, and the new image is associated with the new cluster center. Hence, more than one cluster center may be created and associated with the bucket if the images are not deemed to be similar.

However, if the distance from the large hash value to at least one existing cluster center is less than the threshold distance, then an existing cluster center with the smallest distance to the large hash value of the new image may be identified. Another existing cluster center with a distance of less than the threshold distance to the large hash value may also be selected. In any case, the new image may be associated with the identified existing cluster center. The new image is considered to be similar to the images associated with the identified existing cluster center.

As another example, with respect to determination of false negatives, a large hash value of a new image may be determined. The large hash value may be determined using, for example, a content-aware large hashing function. A small hash value then may be determined from the large hash value of the new image. The small hash value may be determined by using, for example, a locality-sensitive hashing function. A vertex of a d-D coordinate system that is nearest to the small hash is determined. The nearest vertex may be determined by (i) quantizing the d values of the small hash value and (ii) identifying the vertex in the d-D coordinate system defined by the d quantized values.

Buckets that are close to the small hash value may be identified based on the vertex. The identified buckets may be those that are adjacent to the small hash value and having the vertex determined before as one of their vertices. The buckets that are close to the small hash value may also be identified in other manners. In any case, all existing cluster centers that are associated with the identified buckets may be identified. The search space for the new image is substantially reduced by considering only cluster centers that are associated with the buckets that are close to the small hash value instead of all cluster centers associated with all buckets. A determination is then made whether there is any existing cluster center associated with any of the identified buckets. If not, then the large hash value of the new image is the first large hash value to be projected onto one of the identified buckets. A new cluster center then may be created for the new image and is given the coordinates of the large hash value. The new image is then associated with the new cluster center.

Conversely, if there is at least one existing cluster center associated with the identified buckets, then the distance between the large hash value and each existing cluster center associated with any identified bucket may be determined. A determination then may be made whether the distance from the large hash value to any existing cluster center is less than a threshold distance. If not, then the new image is considered to be different from the images associated with the existing cluster centers. A new cluster center then may be created for the new image, and the new image is associated with the new cluster center.

However, if the distance from the large hash value to at least one existing cluster center is less than the threshold distance, then an existing cluster center with the smallest distance to the large hash value of the new image is identified. Another existing cluster center with a distance of less than the threshold distance to the large hash value may also be selected. In any case, the new image may be associated with the identified existing cluster center. The new image is considered to be similar to the images associated with the identified existing cluster center.

Administrative Action

Association of images with cluster centers facilitates administrative action that may be taken by the social networking system 130 on similar images. The administration action module 270 in FIG. 2 may be programmed to perform takedown and blocking functions with respect to similar images. Takedown or blocking functions may be performed when, for example, an image is deemed undesirable or otherwise deemed inappropriate in a particular circumstance, and all similar images should be taken down or blocked from the social networking system 130. The functions may be performed by following, or "crawling," the path of associations between cluster centers and their corresponding similar images.

Figure 10A:
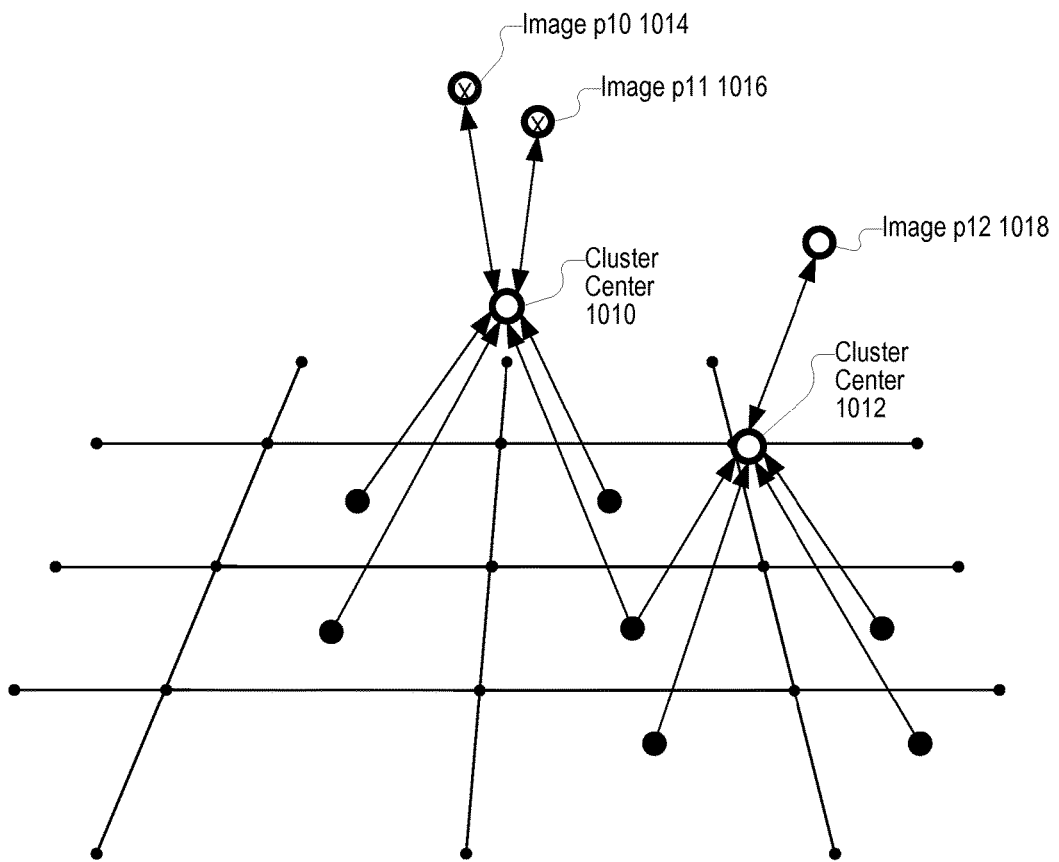
FIGS. 10A-10B illustrate administrative action performed by the social networking system in accordance with an embodiment of the invention.
Figure 10B:
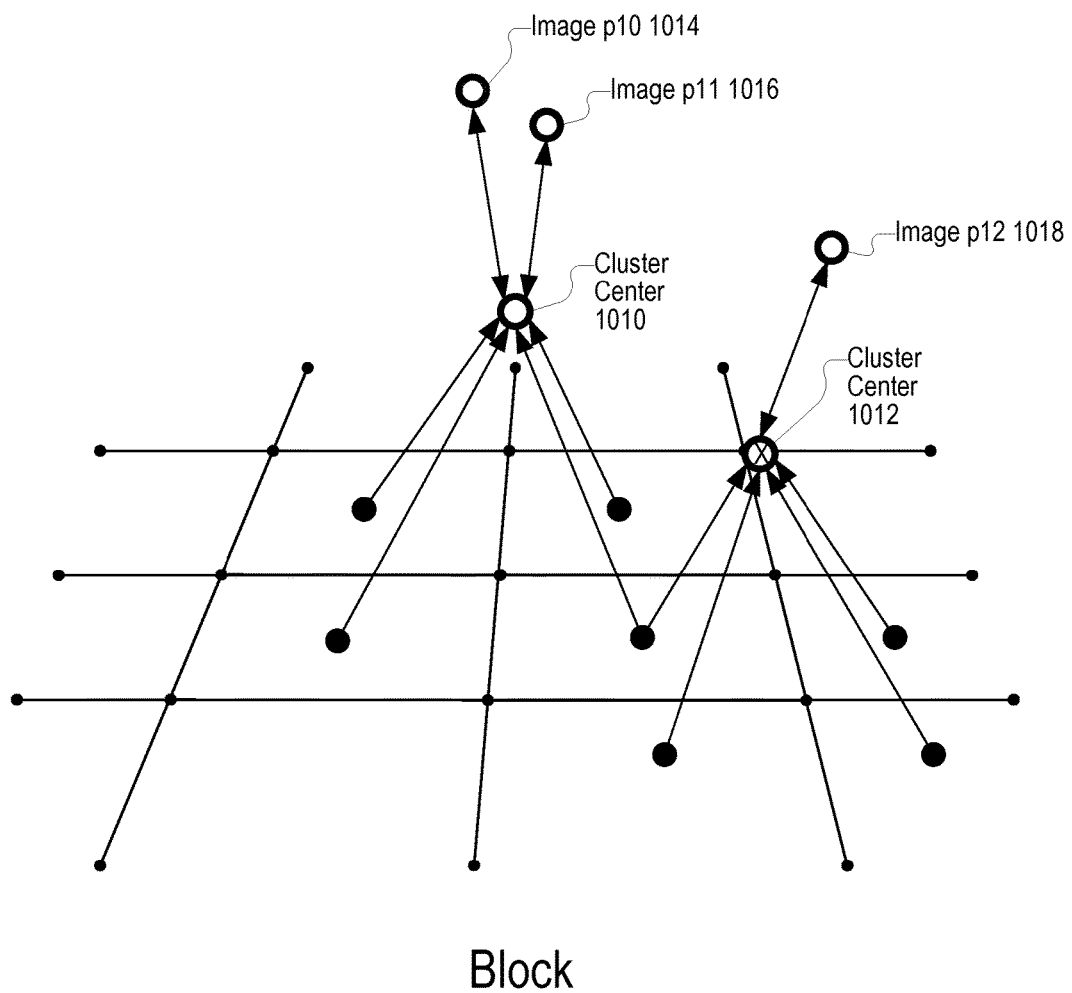

In FIGS. 10A-10B, a cluster center 1010 is mutually (i.e., two-way) associated with images p10 1014, p11 1016. A cluster center 1012 is mutually (i.e., two-way) associated with image p12 1018. FIG. 10A illustrates a takedown function performed by the administrative action module 270 in accordance with an embodiment of the invention. If, for example, the image p10 1014 is deemed inappropriate, the cluster center 1010 associated with the image p10 1014 may be identified by following the path of their association from the image p10 1014 to the cluster center 1010. Then, the image p11 1016 associated with the cluster center 1010 may be identified by following the path of their association from the cluster center 1010 to the image p11 1016. In a similar manner, all images that are similar to the image p10 1014 and associated with the cluster center 1010, like the image p11 1016, can be identified. Thus, once the cluster center 1010 is identified, administrative action can follow the path of all associations from the cluster center 1010 to all associated images (e.g., the images p10 1014, p11 1016) to take down the images from the social networking system 130.

FIG. 10B illustrates a blocking function performed by the administrative action module 270 in accordance with an embodiment of the invention. If, for example, the image p12 1018 is deemed inappropriate, the cluster center 1012 associated with the image p12 1018 may be identified by following the path of their association from the image p12 1018 to the cluster center 1012. All images similar to the image p12 1018 will be associated with the cluster center 1012. Thus, once the cluster center 1012 is identified, the cluster center 1012 may be controlled by the administrative action so that any future similar images that otherwise would be associated with the cluster center 1012 will not be able to be posted to the social networking system 130.

In an embodiment of the invention, the administration action module 270 may perform other functions. For example, if the social networking system 130 permits the posting of similar images, a message may be delivered or action may be taken with respect to users that have posted or will post similar images. The cluster center corresponding to an image of interest may be identified by following the path of their association from the image of interest to the associated cluster center. Then, all images similar to the image of interest can be identified by following the path of their associations from the cluster center. Then, users of the social networking system 130 who are associated with the similar images can be identified by following the path of their associations from each of the similar images to the associated users. Once the users are identified, messages may be delivered to them or action may be taken as to them.

Figure 11:
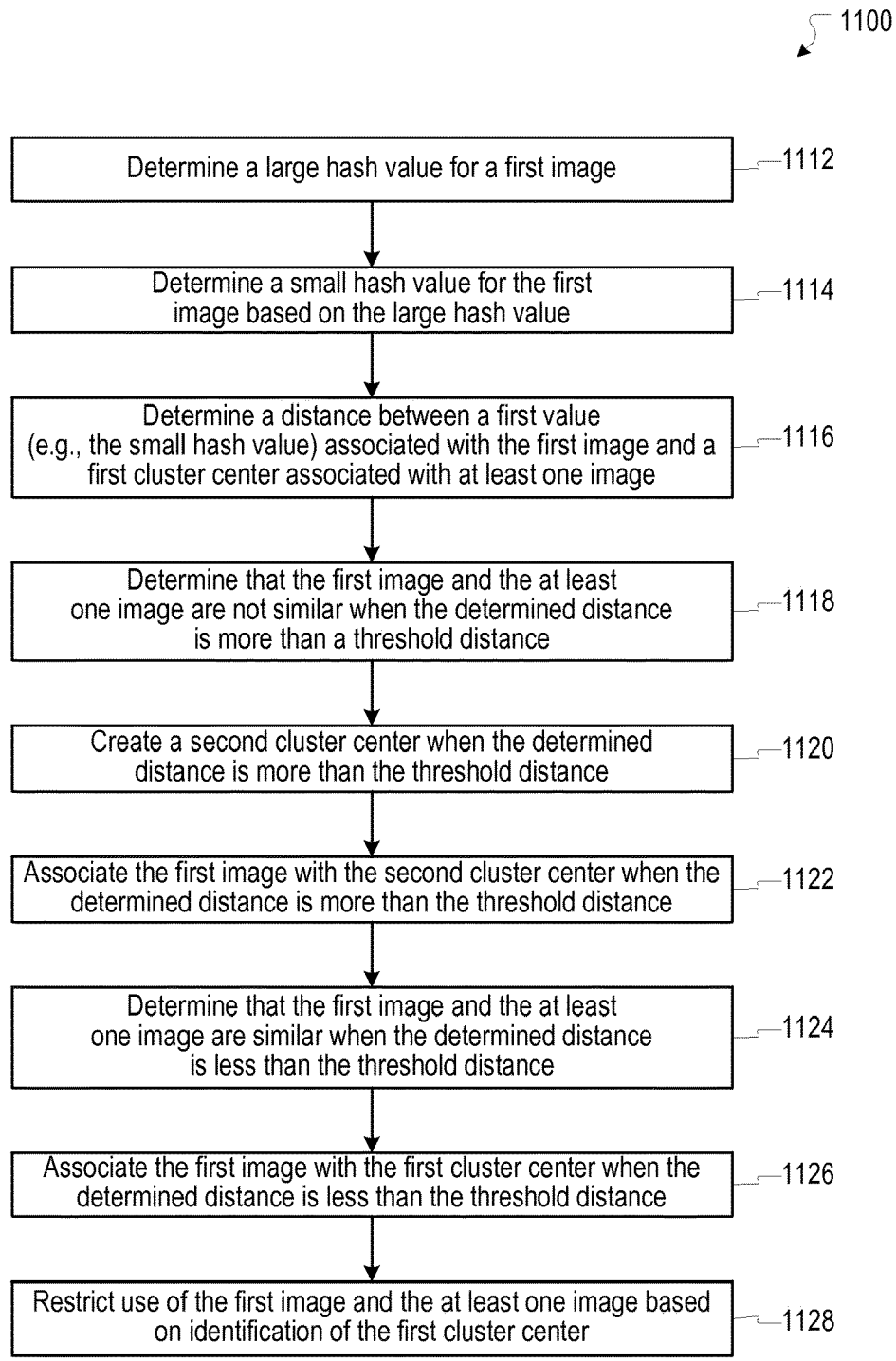
FIG. 11 is a process for restricting use of an image in accordance with an embodiment of the invention.

FIG. 11 shows a process 1100 for restricting use of an image in accordance with an embodiment of the invention. Initially, in block 1112, a large hash value for a first image is determined. In block 1114, a small hash value for the first image is determined based on the large hash value. In block 1116, a distance between a first value (e.g., the small hash value) associated with the first image and a first cluster center associated with at least one image is determined. In block 1118, the first image and the at least one image are determined to be not similar when the determined distance is more than a threshold distance. In block 1120, a second cluster center is created when the determined distance is more than the threshold distance. In block 1122, the first image is associated with the second cluster center when the determined distance is more than the threshold distance. In block 1124, the first image and the at least one image are determined to be similar when the determined distance is less than the threshold distance. In block 1126, the first image is associated with the first cluster center when the determined distance is less than the threshold distance. In block 1128, use of the first image and the at least one image is restricted based on identification of the first cluster center.

In an embodiment of the invention, the process 1100 may be entirely or partially performed by the image similarity analysis module 132. In an embodiment of the invention, the process 1100 may be performed at least in part by the social networking system 130.

CONCLUSION

Figure 12:
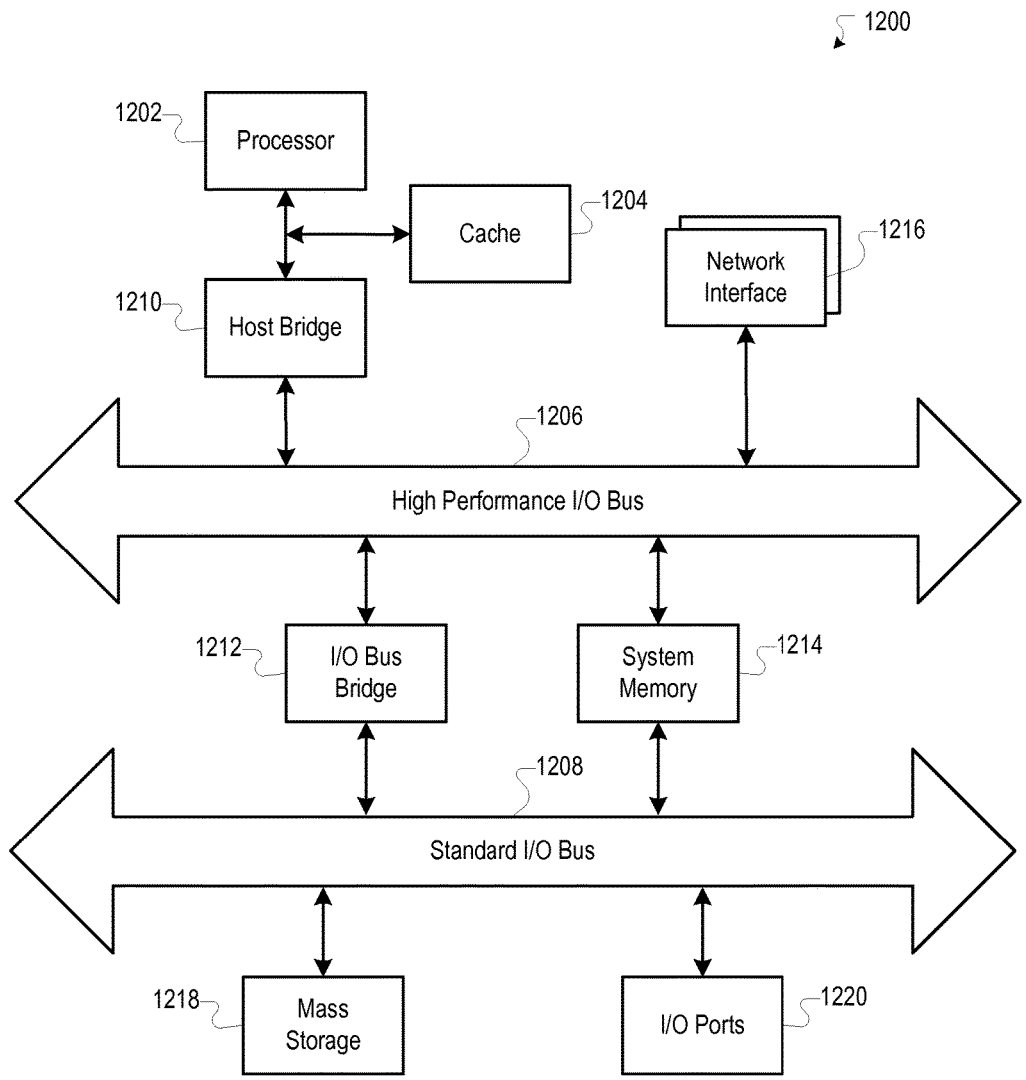
FIG. 12 is a diagram of a computer system in accordance with an embodiment of the invention.

The foregoing processes and features can be implemented by a wide variety of machine and computer system architectures and in a wide variety of network and computing environments. FIG. 12 illustrates an example of a computer system 1200 that may be used to implement one or more of the computing devices identified above. The computer system 1200 includes sets of instructions for causing the computer system 1200 to perform the processes and features discussed herein. The computer system 1200 may be connected (e.g., networked) to other machines. In a networked deployment, the computer system 1200 may operate in the capacity of a server machine or a client machine in a client-server network environment, or as a peer machine in a peer-to-peer (or distributed) network environment. In an embodiment of the invention, the computer system 1200 may be the social networking system 130, the user device 110, and the external system 120, or a component thereof. In an embodiment of the invention, the computer system 1200 may be one server among many that constitutes all or part of the social networking system 130.

The computer system 1200 includes a processor 1202, a cache memory 1204, and one or more executable modules and drivers, stored on a computer readable medium, directed to the processes and features described herein. Additionally, the computer system 1200 includes a high performance input/output (I/O) bus 1206 and a standard I/O bus 1208. A host bridge 1210 couples processor 1202 to high performance I/O bus 1206, whereas I/O bus bridge 1212 couples the two buses 1206 and 1208 to each other. A system memory 1214 and one or more network/communication interfaces 1216 couple to bus 1206. The computer system 1200 may further include video memory and a display device coupled to the video memory (not shown). Mass storage 1218, and I/O ports 1220 couple to the bus 1208. The computer system 1200 may optionally include a keyboard and pointing device, a display device, or other input/output devices (not shown) coupled to the bus 1208. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1200, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1200 are described in greater detail below. In particular, the network interface 1216 provides communication between the computer system 1200 and any of a wide range of networks, such as an Ethernet (e.g., IEEE 802.3) network, a backplane, etc. The mass storage 1218 provides permanent storage for the data and programming instructions to perform the above-described processes and features implemented by the respective computing systems identified above, whereas the system memory 1214 (e.g., DRAM) provides temporary storage for the data and programming instructions when executed by the processor 1202. The I/O ports 1220 may be one or more serial and/or parallel communication ports that provide communication between additional peripheral devices, which may be coupled to the computer system 1200.

The computer system 1200 may include a variety of system architectures, and various components of the computer system 1200 may be rearranged. For example, the cache 1204 may be on-chip with processor 1202. Alternatively, the cache 1204 and the processor 1202 may be packed together as a "processor module," with processor 1202 being referred to as the "processor core." Furthermore, certain embodiments of the invention may neither require nor include all of the above components. For example, peripheral devices coupled to the standard I/O bus 1208 may couple to the high performance I/O bus 1206. In addition, in some embodiments, only a single bus may exist, with the components of the computer system 1200 being coupled to the single bus. Furthermore, the computer system 1200 may include additional components, such as additional processors, storage devices, or memories.

In general, the processes and features described herein may be implemented as part of an operating system or a specific application, component, program, object, module, or series of instructions referred to as "programs." For example, one or more programs may be used to execute specific processes described herein. The programs typically comprise one or more instructions in various memory and storage devices in the computer system 1200 that, when read and executed by one or more processors, cause the computer system 1200 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1200, individually or collectively in a distributed computing environment. The foregoing modules may be realized by hardware, executable modules stored on a computer readable medium (or machine readable medium), or a combination of both. For example, the modules may comprise a plurality or series of instructions to be executed by a processor in a hardware system, such as the processor 1202. Initially, the series of instructions may be stored on a storage device, such as the mass storage 1218. However, the series of instructions can be stored on any suitable computer readable storage medium. Furthermore, the series of instructions need not be stored locally, and could be received from a remote storage device, such as a server on a network, via the network/communications interface 1216. The instructions are copied from the storage device, such as the mass storage 1218, into the memory 1214 and then accessed and executed by processor 1202.

Examples of computer readable media include but are not limited to recordable type media such as volatile and non-volatile memory devices, solid state memories, floppy and other removable disks, hard disk drives, magnetic media, optical disks (e.g., Compact Disk Read-Only Memory (CD ROMS), Digital Versatile Disks (DVDs)), other similar non-transitory (or transitory), tangible (or non-tangible) storage medium, or any type of medium suitable for storing, encoding, or carrying a series of instructions for execution by the computer system 1200 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described which may be variously combined and included in some embodiments but also variously omitted in other embodiments. Similarly, various features are described that may be preferences or requirements for some embodiments but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   by one or more computing devices, receiving an image;
   by the one or more computing devices, generating a single large hash value based on the image and a content-aware hashing function, wherein the large hash value has a first number of dimensions;
   by the one or more computing devices, generating a small hash value from the large hash value using a locality-sensitive hashing function, wherein the small hash value has a second number of dimensions, the second number being smaller than the first number; and
   by the one or more computing devices, determining whether the image is similar to one or more other images based on a comparison of the small hash value corresponding to the image to one or more small hash values corresponding to the one or more other images, respectively, wherein each of the one or more small hash values is generated from a large hash value that was generated based on the corresponding image and the content-aware hashing function.

2. The method of claim 1, wherein the determining whether the image is similar to the one or more other images is based on a distance between the small hash value and a first cluster center associated with the one or more other images, wherein the first cluster center has the second number of dimensions.

3. The method of claim 2, wherein:
   the image and the one or more other images are determined to be similar if the distance is less than a threshold distance; and
   the image and the one or more other images are determined to be not similar if the distance is more than a threshold distance.

4. The method of claim 3, wherein if the distance is more than a threshold distance, then creating a second cluster center and associating the image with the second cluster center.

5. The method of claim 3, wherein if the distance is less than a threshold distance, the image is associated with the first cluster center.

6. The method of claim 2, wherein the determining a first cluster center comprises:
   determining a coordinate system having the second number of dimensions, wherein the coordinate system is divided into a plurality of buckets;
   determining a set comprising one or more of the plurality of buckets, wherein each of the one or more buckets are adjacent to the small hash value in the coordinate system; and
   determining whether there are any existing cluster centers within the set of buckets.

7. The method of claim 6, further comprising selecting a vertex of the plurality of buckets, wherein the selecting is based on the vertex being closest to the small hash value.

8. The method of claim 7, wherein the set of buckets comprises one or more buckets adjacent to the selected vertex.

9. The method of claim 6, wherein the set of buckets comprise buckets within a predetermined layer of bucket-layers from the vertex.

10. The method of claim 6, wherein the set of buckets comprise $2d$ buckets, wherein d is the second number of dimensions.

11. The method of claim 6, further comprising, in response to determining that there are no existing cluster centers within the set of buckets, creating a new cluster center and associating the image with the new cluster center, wherein the new cluster center has coordinates in the coordinate system corresponding to the small hash value.

12. The method of claim 6, wherein the plurality of buckets are determined by segmenting one or more vectors of the coordinate system.

13. The method of claim 2, wherein the threshold distance is programmable.

14. The method of claim 1, wherein the administrative action comprises restricting use of the image and the one or more images based on determining that the image and the one or more images are similar.

15. The method of claim 14, wherein the restricting use comprises removing the image and the one or more images from a data store of a social-networking system.

16. The method of claim 14, wherein the restricting use comprises blocking access to the image and the one or more other images to users of a social-networking system.

17. The method of claim 14, wherein the restricting use comprises blocking posts of the image and the one or more other images to a social-networking system.

18. The method of claim 1, wherein the locality-sensitive hashing function comprises performing a matrix multiplication of the large hash value to reduce the large hash value from the first number of dimensions to the second number of dimensions.

19. The method of claim 1, wherein the determining whether the image is similar to one or more other images is based on:
   a distance between the small hash value corresponding to the image and one or more cluster centers, each of the cluster centers having the second number of dimensions and being associated with one or more other images; and
   a distance between the small hash value corresponding to the image and one or more small hash values corresponding to one or more other images, respectively, associated with one or more cluster centers having a distance from the small hash value satisfying a threshold distance.

20. A system comprising:
   at least one processor; and
   a memory coupled to the at least one processor comprising instruction executable by the at least one processor, the at least one processor being operable when executing the instructions to:
   receive an image;
   generate a single large hash value based on the image and a content-aware hashing function, wherein the large hash value has a first number of dimensions;
   generate a small hash value from the large hash value using a locality-sensitive hashing function, wherein the small hash value has a second number of dimensions, the second number being smaller than the first number; and
   determine whether the image is similar to one or more other images based on a comparison of the small hash value corresponding to the image to one or more small hash values corresponding to the one or more other images, respectively, wherein each of the one or more small hash values is generated from a large hash value that was generated based on the corresponding image and the content-aware hashing function.

21. The system of claim 20, wherein, when executing the instructions, the one or more processors determine whether the image is similar to the one or more other images based on a distance between the small hash value and a first cluster center associated with the one or more other images, wherein the first cluster center has the second number of dimensions.

22. The system of claim 21, wherein:
   the image and the one or more other images are determined to be similar if the distance is less than a threshold distance; and
   the image and the one or more other images are determined to be not similar if the distance is more than a threshold distance.

23. The system of claim 22, wherein if the distance is more than a threshold distance, then creating a second cluster center and associating the image with the second cluster center.

24. The system of claim 22, wherein if the distance is less than a threshold distance, the image is associated with the first cluster center.

25. The system of claim 21, wherein the memory comprises further instructions executable by the at least one processor to determine a first cluster center, the at least one processor being operable when executing the instructions to:
   determine a coordinate system having the second number of dimensions, wherein the coordinate system is divided into a plurality of buckets;
   determine a set comprising one or more of the plurality of buckets, wherein each of the one or more buckets are adjacent to the small hash value in the coordinate system; and
   determine whether there are any existing cluster centers within the set of buckets.

26. The system of claim 25, wherein the at least one processor is further operable when executing the instructions to select a vertex of the plurality of buckets, wherein the selecting is based on the vertex being closest to the small hash value.

27. The system of claim 26, wherein the set of buckets comprises one or more buckets adjacent to the selected vertex.

28. The system of claim 25, wherein the set of buckets comprise buckets within a predetermined layer of bucket-layers from the vertex.

29. The system of claim 25, wherein the set of buckets comprises 2d buckets, wherein d is the second number of dimensions.

30. The system of claim 25, wherein the at least one processor is further operable when executing the instructions to, in response to determining that there are no existing cluster centers within the set of buckets, create a new cluster center and associating the image with the new cluster center, wherein the new cluster center has coordinates in the coordinate system corresponding to the small hash value.

31. The system of claim 25, wherein the plurality of buckets are determined by segmenting one or more vectors of the coordinate system.

32. The system of claim 21, wherein the threshold distance is programmable.

33. The system of claim 20, wherein the administrative action comprises restricting use of the image and the one or more images based on determining that the image and the one or more images are similar.

34. The system of claim 33, wherein the restricting use comprises removing the image and the one or more images from a data store of a social-networking system.

35. The system of claim 33, wherein the restricting use comprises blocking access to the image and the one or more other images to users of a social-networking system.

36. The system of claim 33, wherein the restricting use comprises blocking posts of the image and the one or more other images to a social-networking system.

37. The system of claim 20, wherein the locality-sensitive hashing function comprises performing a matrix multiplication of the large hash value to reduce the large hash value from the first number of dimensions to the second number of dimensions.

38. The system of claim 20, wherein the at least one processor, when executing the instructions, determines whether the image is similar to one or more other images is based on:
 a distance between the small hash value corresponding to the image and one or more cluster centers, each of the cluster centers having the second number of dimensions and being associated with one or more other images; and
 a distance between the small hash value corresponding to the image and one or more small hash values corresponding to one or more other images, respectively, associated with one or more cluster centers having a distance from the small hash value satisfying a threshold distance.

39. One or more computer-readable non-transitory storage media embodying software that is operable when executed to:
 receive an image;
 generate a single large hash value based on the image and a content-aware hashing function, wherein the large hash value has a first number of dimensions;
 generate a small hash value from the large hash value using a locality-sensitive hashing function, wherein the small hash value has a second number of dimensions, the second number being smaller than the first number; and
 determine whether the image is similar to one or more other images based on a comparison of the small hash value corresponding to the image to one or more small hash values corresponding to the one or more other images, respectively, wherein each of the one or more small hash values is generated from a large hash value that was generated based on the corresponding image and the content-aware hashing function.

40. The media of claim 39, wherein, the software is operable when executed to determine whether the image is similar to the one or more other images based on a distance between the small hash value and a first cluster center associated with the one or more other images, wherein the first cluster center has the second number of dimensions.

41. The media of claim 40, wherein:
 the image and the one or more other images are determined to be similar if the distance is less than a threshold distance; and
 the image and the one or more other images are determined to be not similar if the distance is more than a threshold distance.

42. The media of claim 41, wherein if the distance is more than a threshold distance, then creating a second cluster center and associating the image with the second cluster center.

43. The media of claim 41, wherein if the distance is less than a threshold distance, the image is associated with the first cluster center.

44. The media of claim 40, wherein, to determine a first cluster center, the software is operable when executed to:
 determine a coordinate system having the second number of dimensions, wherein the coordinate system is divided into a plurality of buckets;
 determine a set comprising one or more of the plurality of buckets, wherein each of the one or more buckets are adjacent to the small hash value in the coordinate system; and
 determine whether there are any existing cluster centers within the set of buckets.

45. The media of claim 44, wherein the software is further operable when executed to select a vertex of the plurality of buckets, wherein the selecting is based on the vertex being closest to the small hash value.

46. The media of claim 45, wherein the set of buckets comprises one or more buckets adjacent to the selected vertex.

47. The media of claim 44, wherein the set of buckets comprise buckets within a predetermined layer of bucket-layers from the vertex.

48. The media of claim 44, wherein the set of buckets comprises 2d buckets, wherein d is the second number of dimensions.

49. The media of claim 44, wherein the software is further operable when executed to, in response to determining that there are no existing cluster centers within the set of buckets, create a new cluster center and associating the image with the new cluster center, wherein the new cluster center has coordinates in the coordinate system corresponding to the small hash value.

50. The media of claim 44, wherein the plurality of buckets are determined by segmenting one or more vectors of the coordinate system.

51. The media of claim 40, wherein the threshold distance is programmable.

52. The media of claim 39, wherein the administrative action comprises restricting use of the image and the one or more images based on determining that the image and the one or more images are similar.

53. The media of claim 52, wherein the restricting use comprises removing the image and the one or more images from a data store of a social-networking system.

54. The media of claim 52, wherein the restricting use comprises blocking access to the image and the one or more other images to users of a social-networking system.

55. The media of claim 52, wherein the restricting use comprises blocking posts of the image and the one or more other images to a social-networking system.

56. The media of claim 39, wherein the locality-sensitive hashing function comprises performing a matrix multiplication of the large hash value to reduce the large hash value from the first number of dimensions to the second number of dimensions.

57. The media of claim 39, wherein the software is operable when executed to determine whether the image is similar to one or more other images is based on:
 a distance between the small hash value corresponding to the image and one or more cluster centers, each of the cluster centers having the second number of dimensions and being associated with one or more other images; and
 a distance between the small hash value corresponding to the image and one or more small hash values corresponding to one or more other images, respectively, associated with one or more cluster centers having a distance from the small hash value satisfying a threshold distance.

* * * * *